Figure 6:
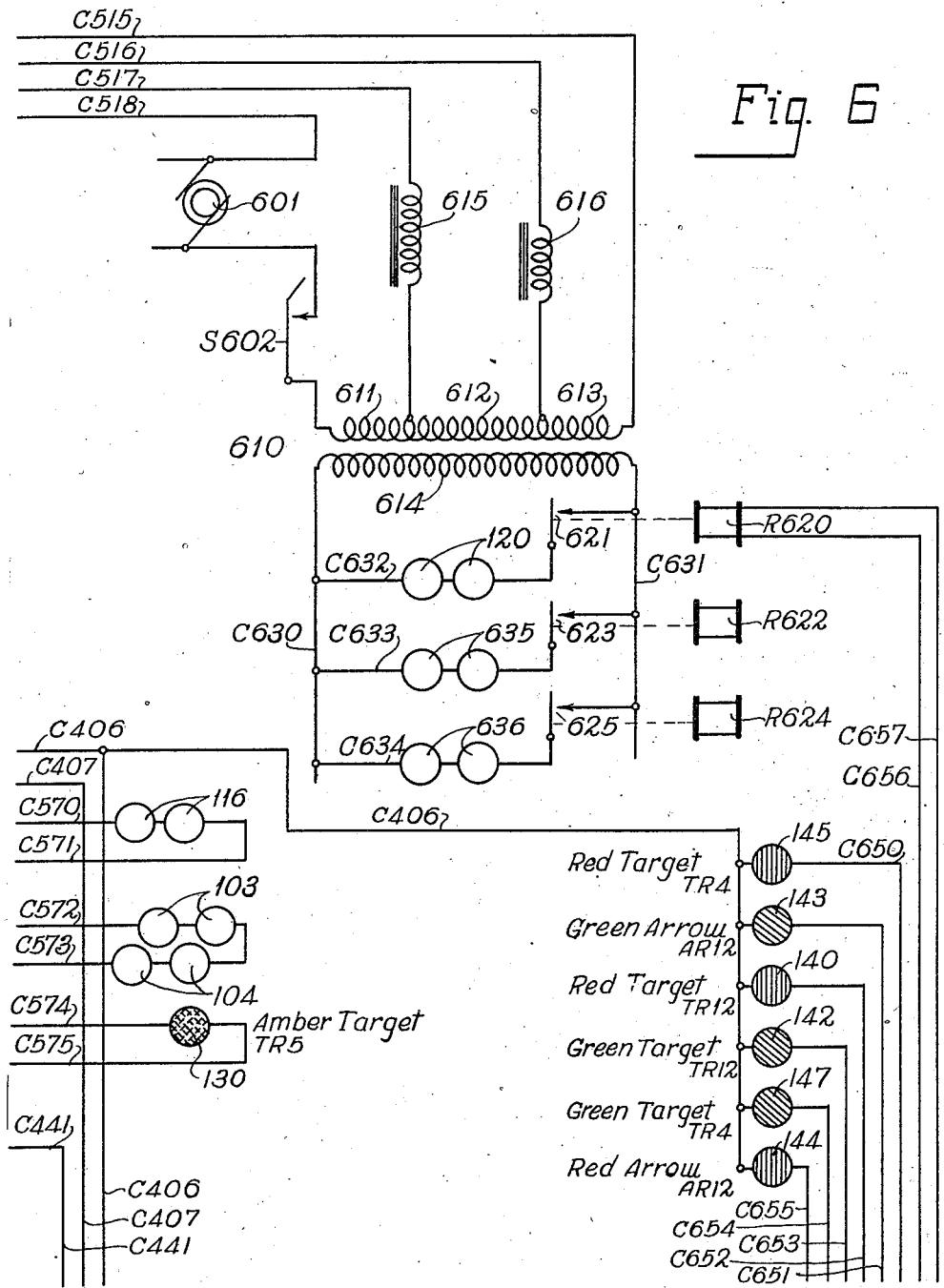

Sept. 29, 1942.   I. MOLNAR   2,296,941
ELECTRIC CONTROL SYSTEM
Filed Sept. 16, 1939   9 Sheets-Sheet 1
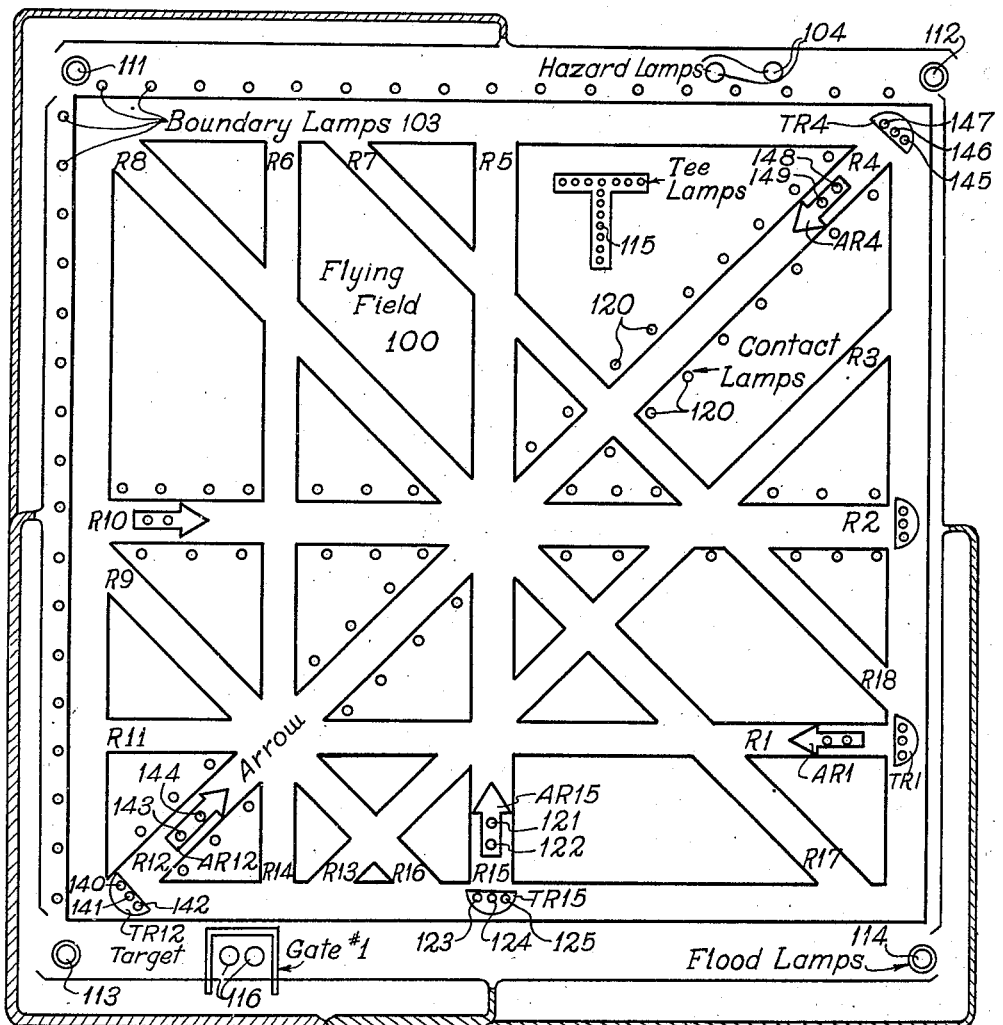
Fig 1
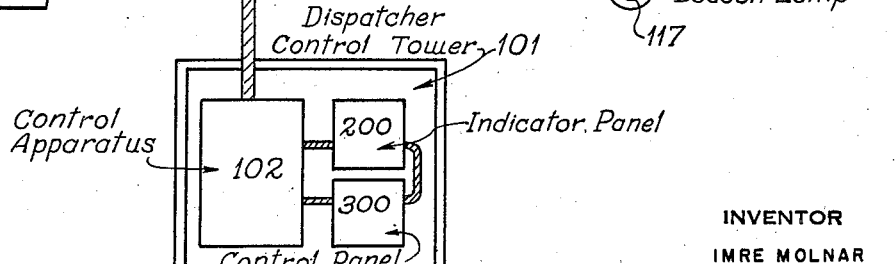
INVENTOR
IMRE MOLNAR
BY
Davis, Lindsey, Smith & Shonts
ATTORNEYS.

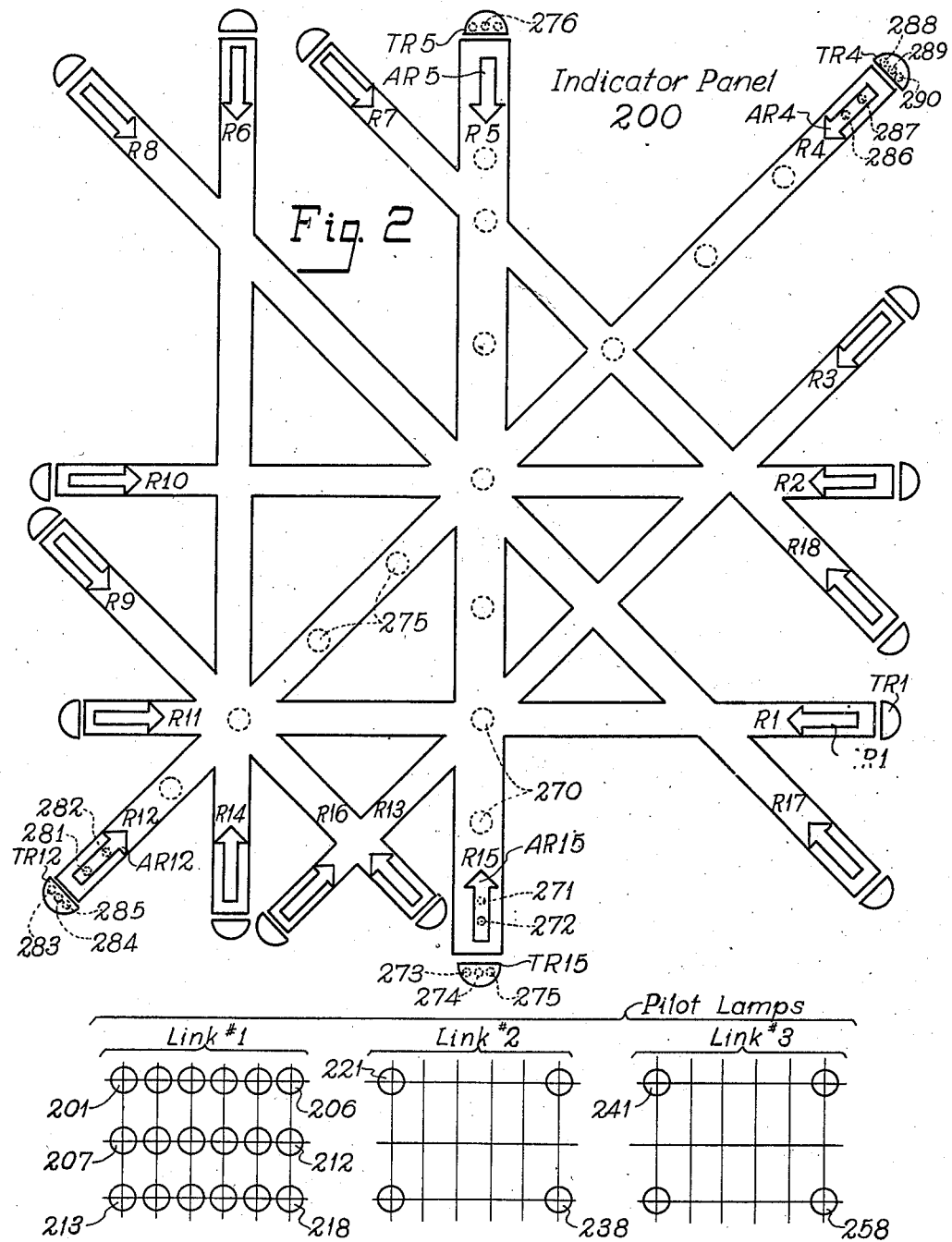

Sept. 29, 1942.　　　　I. MOLNAR　　　　2,296,941
ELECTRIC CONTROL SYSTEM
Filed Sept. 16, 1939　　　　9 Sheets-Sheet 3
Fig. 3　　　Control Panel 300
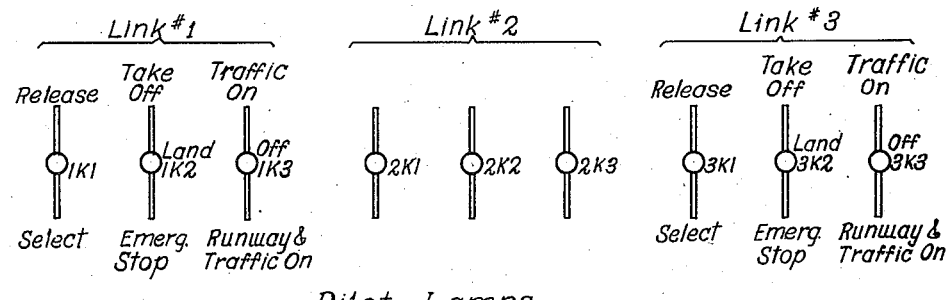
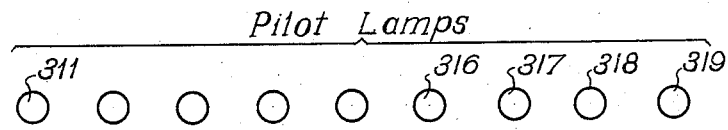
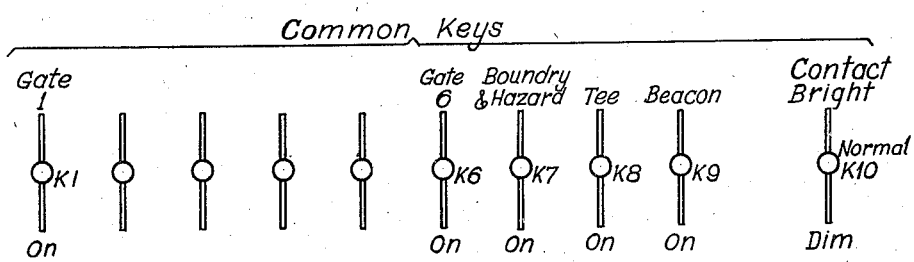
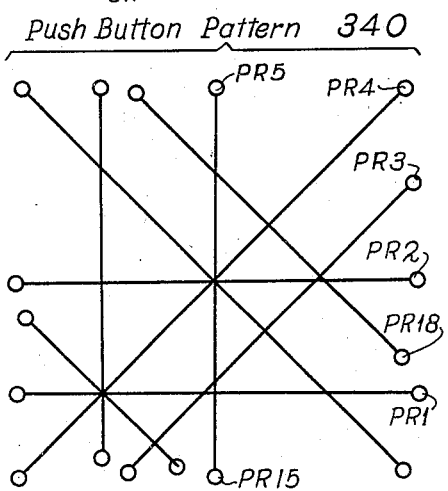
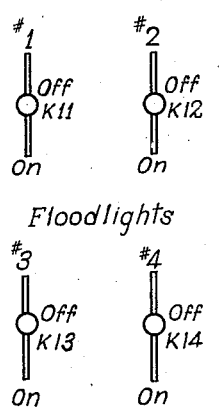
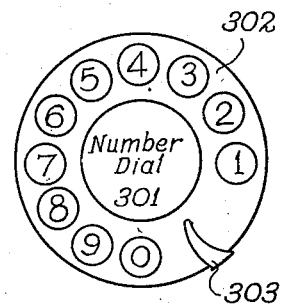
INVENTOR
IMRE MOLNAR
BY
Davis, Lindsey, Smith & Shonts
ATTORNEYS.

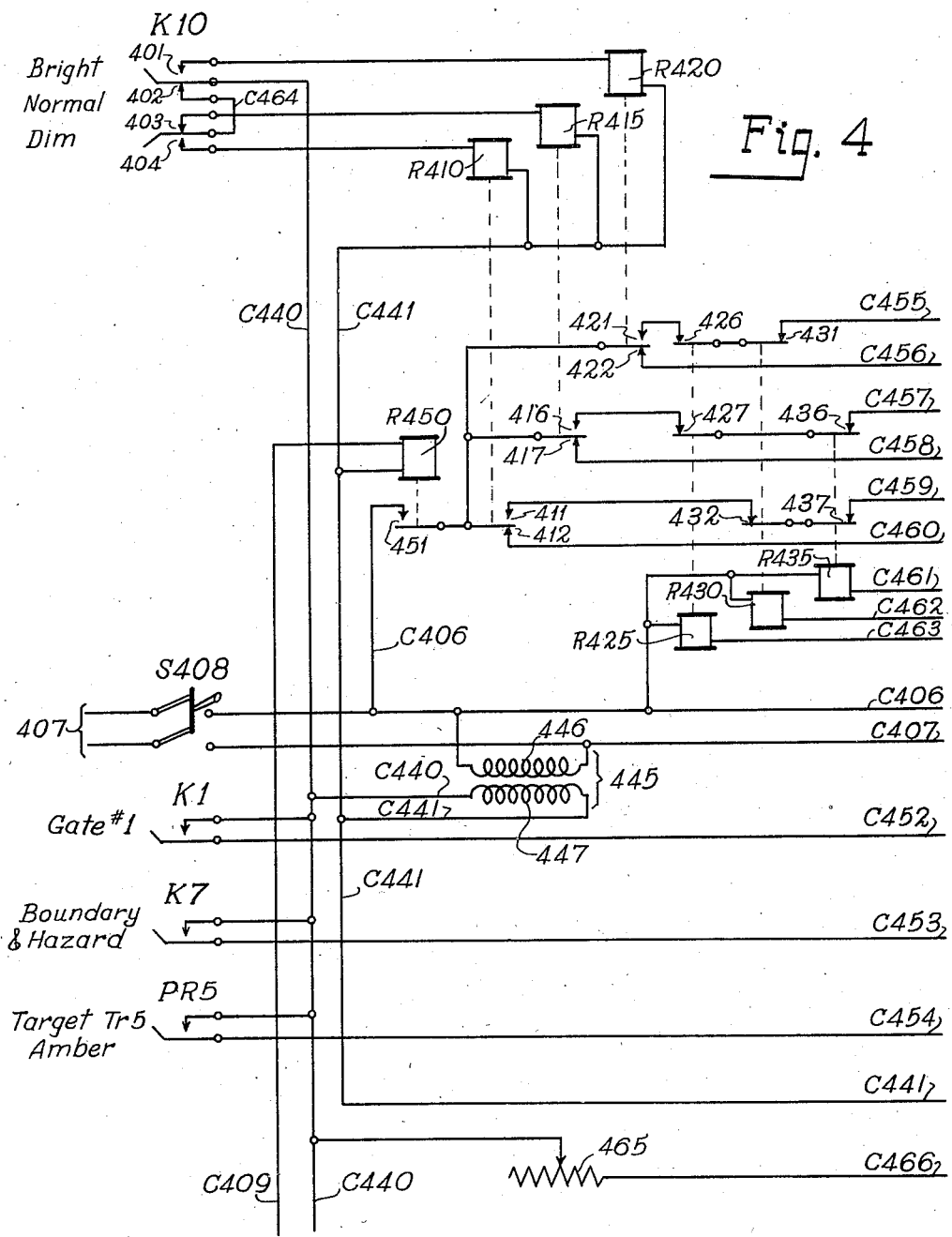

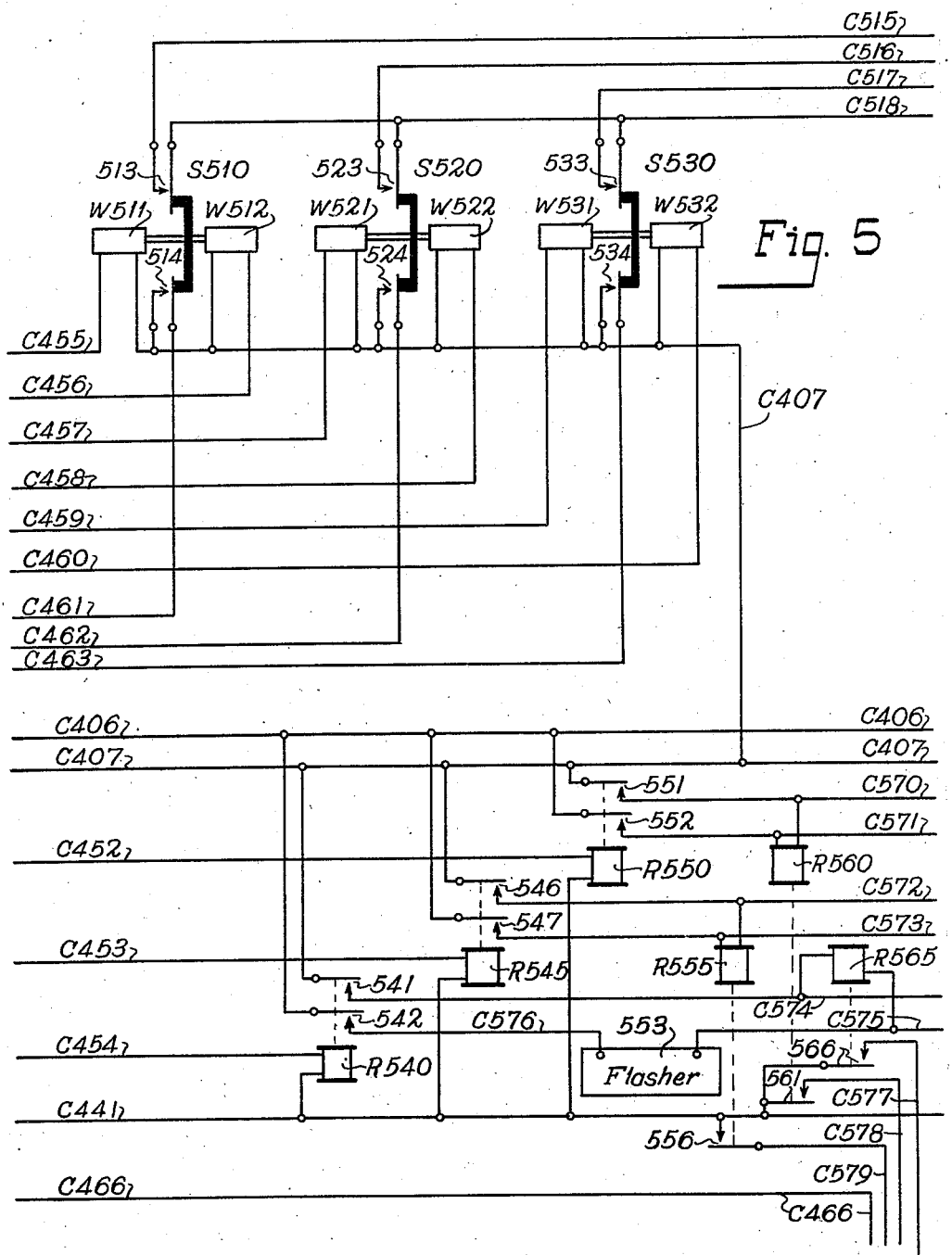

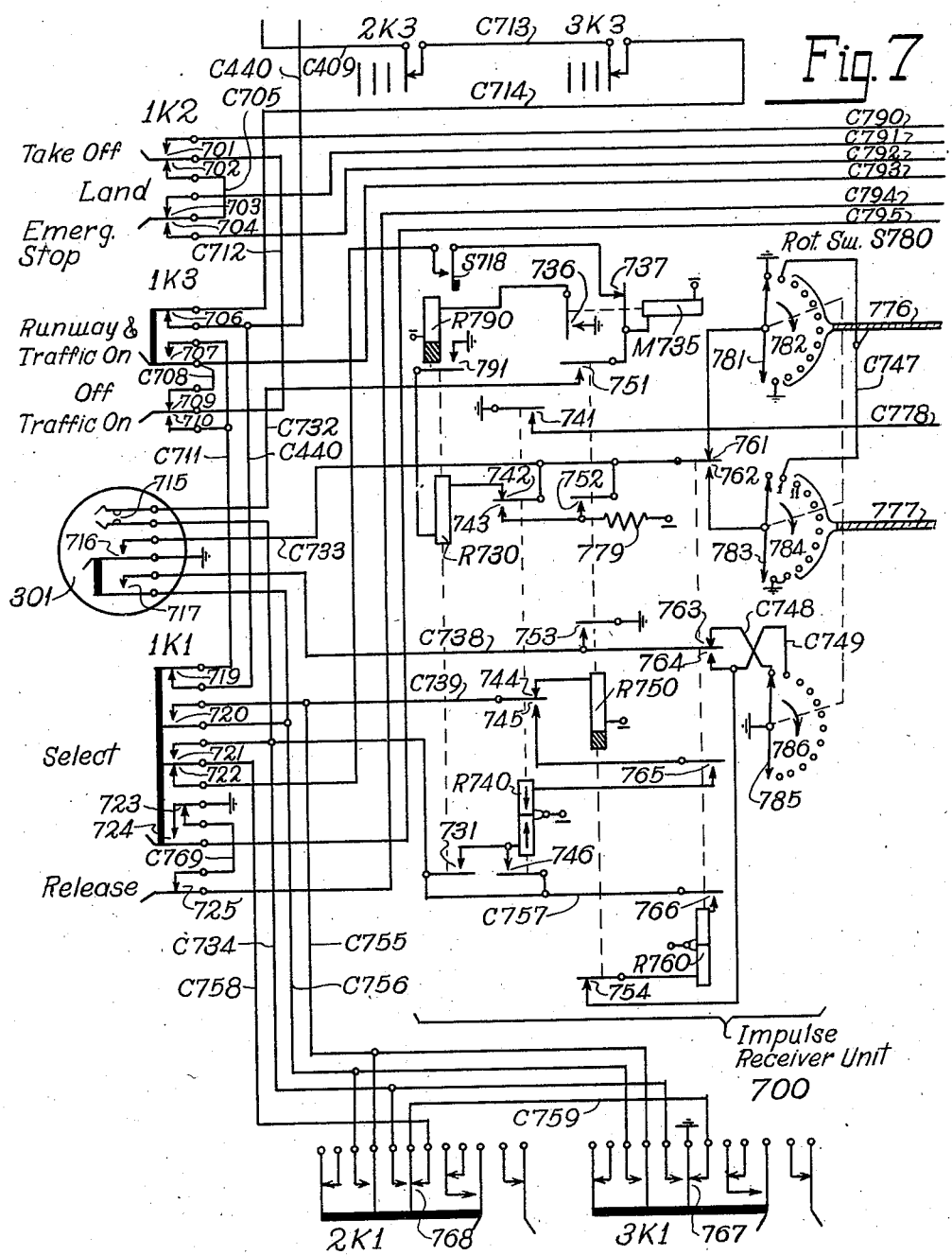

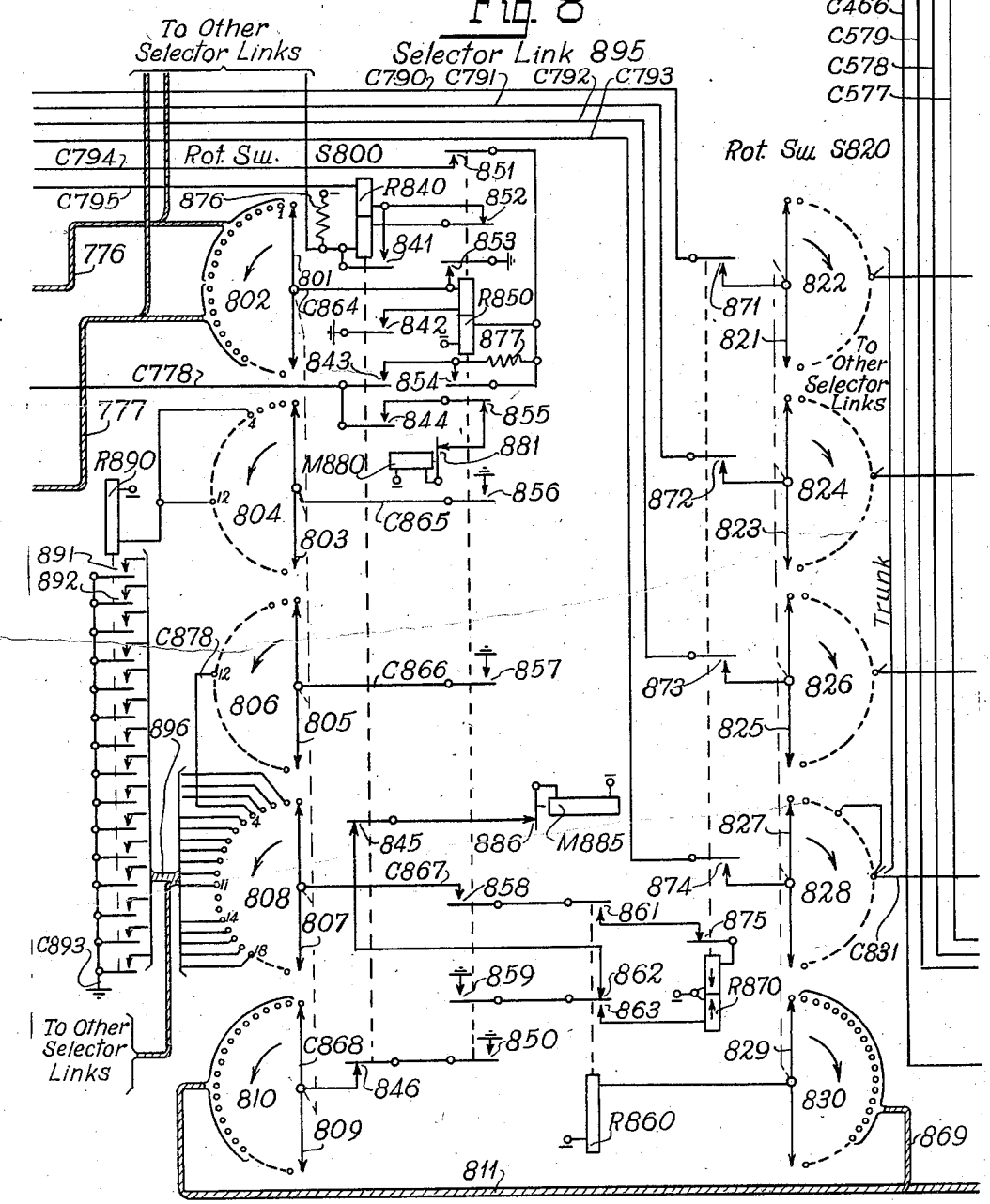

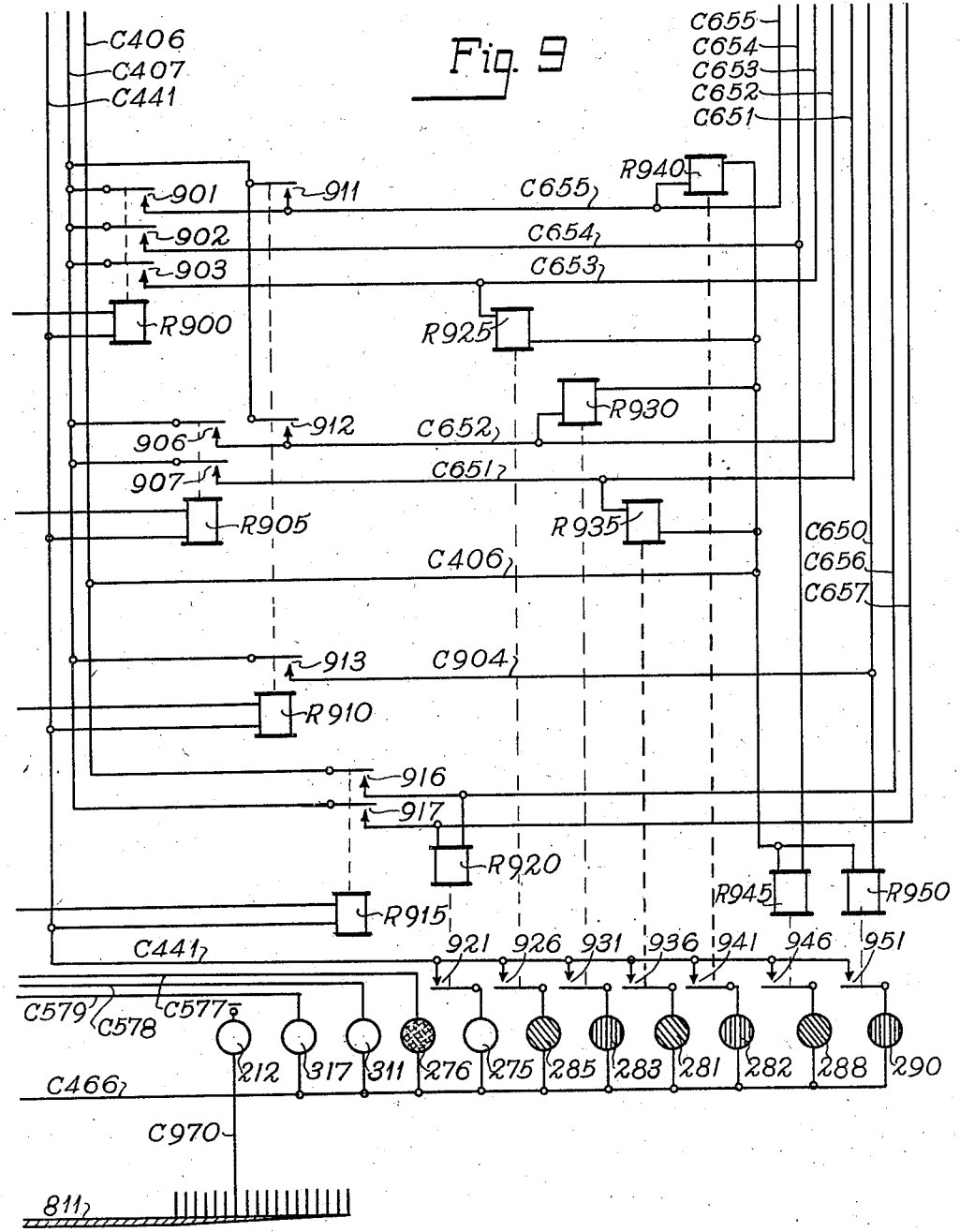

Patented Sept. 29, 1942

2,296,941

UNITED STATES PATENT OFFICE 2,296,941

ELECTRIC CONTROL SYSTEM

Imre Molnar, Chicago, Ill., assignor to Associated Electric Laboratories, Inc., Chicago, Ill., a corporation of Delaware Application September 16, 1939, Serial No. 295,345

17 Claims. (Cl. 177—353)

The present invention relates to electric control systems and more particularly to automatic switching apparatus therefor.

Electric control systems frequently comprise a plurality of trunks each including a number of control circuits, a plurality of automatic switches each operative to seize any one of the trunks, and means for selectively governing the control circuits in a seized one of the trunks. It often occurs that the devices controlled by the control circuits in the various trunks are so interrelated that the control of one of the devices by way of one of the control circuits in one of the trunks is inconsistent and conflicting with the control of another of the devices by way of another of the control circuits in another of the trunks. For example, in an airport lighting and traffic control system comprising a flying field having a plurality of airplane runways thereon, wherein some of the runways are arranged in intersecting relationship with respect to other of the runways and in non-intersecting relationship with respect to still other of the runways it is inconsistent and conflicting to govern the control circuits in a trunk extending to the illumination means and the traffic signals individually associated with one of the runways while the control circuits in a trunk extending to the illumination means and the traffic signals associated with an intersecting runway are being governed.

Accordingly, it is an object of the present invention to provide in an electric control system of the type noted including a plurality of trunks, a plurality of automatic switches each having access to the trunks and embodying an improved arrangement for testing both a selecting marking and a seizure marking of any one of the trunks prior to actual seizure thereof, wherein a trunk is marked against selection when it has been previously selected by another of the automatic switches and marked against seizure when a conflicting trunk has been previously selected by another of the automatic switches.

Another object of the invention is to provide in an electric control system of the type noted including a plurality of trunks, wherein some of the trunks have one digit designations and other of the trunks have two digit designations, improved switching apparatus of the numerical type, which is so connected and arranged that it is responsive to the digits 1 or 2 respectively to select the trunks having the corresponding designations 1 or 2 and responsive to the digit 1 followed by the digits 1 or 2 respectively to select the trunks having the corresponding designation 11 or 12.

A further object of the invention is to provide an electric control system comprising improved switching apparatus which is simple and economical to manufacture and which is thoroughly reliable in operation.

The features of the present invention are illustrated as being incorporated in an airport comprising a flying field having a plurality of airplane runways thereon, some of the runways being arranged in intersecting relationship with respect to other of the runways and in non-intersecting relationship with respect to still other of the runways. Illumination means and groups of traffic signals are individually associated with the runways. More particularly, the illumination means associated with each runway comprises rows of contact lamps disposed along the margins thereof; and the group of traffic signals associated with each runway comprises two targets and two arrows, the targets being associated with the opposite ends of the runway and the arrows being associated with the stretch of the runway. Two trunks are individually associated with each runway, the two trunks individually associated with a runway being individually selected in accordance with the direction of airplane traffic on the runway. Also, each trunk includes a plurality of control circuits for selectively governing the illumination means and the traffic signals associated with the associated runway. Further, the airport comprises a dispatcher station including apparatus for selectively controlling the illumination means and the traffic signals and for supervising the control thereof.

In accordance with one feature of the invention the system comprises an impulse receiver unit, a plurality of numerical selector links each having access to the trunks, and a plurality of control devices at the dispatcher station individually associated with the selector links, each of the control devices having a normal position and two operated positions. Also, the system comprises means controlled by the operation of any one of the control devices from its normal position to one of its operated positions for selecting the corresponding one of the selector links for use and for associating the selected selector link with the impulse receiver unit and means controlled when the selected selector link is associated with the impulse receiver unit for preventing any of the other selector links from being associated with the impulse receiver unit. The impulse receiver unit is operative in response to any numerical signal to test the selection marking of a corresponding one of the trunks, and a signal transmitter is provided at the dispatcher station which is operative to transmit different numerical signals to the impulse receiver unit. The impulse receiver unit comprises means controlled in the event the one trunk is tested as not marked against selection for preparing the selected selector link to select the one trunk, for causing the selected selector link to mark the one trunk against selection by the other of the selector links, and for marking certain other of the trunks against seizure by the other selector links.

The selected selector link comprises means controlled by the operation of the one control device from its one operated position back to its normal position for causing the selected selector link to select the one trunk and to test the seizure marking thereof, means for causing the selected selector link to seize the one trunk in the event it is tested as not marked against seizure, and means controlled by the operation of the one device from its normal position to the other of its operated positions for releasing the selected selector link. When the selected selector link is released the one trunk is marked to be selected by the other of the selector links and the other trunks are marked to be seized by the other of the selector links. Finally, a device is provided at the dispatcher station for selectively governing the control circuits in a seized one of the trunks.

In accordance with another feature of the invention some of the trunks have one digit designations and other of the trunks have two digit designations and the impulse receiver unit is so connected and arranged that it is responsive to the digits 1 or 2 respectively to mark for selection the trunks designated 1 or 2 and responsive to the digit 1 followed by the digits 1 or 2 respectively to mark for selection the trunks designated 11 or 12. Further, the impulse receiver unit causes the selected selector link to seize the particular trunk marked for selection in the event it is not marked against seizure.

Further features of the invention pertain to the particular connection and arrangement of the circuit elements of the system, whereby the above-outlined and additional operating features are attained.

The novel features believed to be characteristic of the invention are set forth with particularity in the appended claims. The invention both as to its organization and method of operation, together with further objects and advantages thereof, will best be understood by reference to the following specification taken in connection with the accompanying drawings, in which Figure 1 illustrates diagrammatically an airport lighting and traffic control system; Fig. 2 illustrates diagrammatically an indicator panel incorporated in the system; Fig. 3 illustrates diagrammatically a control panel incorporated in the system; and Figs. 4 to 9, inclusive, taken together, illustrate diagrammatically the details of the control apparatus incorporated in the system, this apparatus including an impulse receiver unit, a number of numerical selector links, and control means therefor embodying the present invention.

Referring now more particularly to Fig. 1 of the drawings, the airport there illustrated comprises a flying field 100 and a dispatcher control tower or station 101, from which the entire flying field is clearly visible to the dispatcher. The flying field 100 comprises nine paved runways over which airplane traffic may be routed in either direction, whereby the runways comprise eighteen directional runway ends R1 to R18, inclusive, for airplane traffic. Some of the runways are arranged in parallel relationship, while others of the runways are arranged in intersecting relationship, thus providing a general crisscross pattern upon the flying field. Further, the flying field is provided with a paved rectangular boundary way communicating with each of the runway ends in order to facilitate movement of the airplanes from the hangers to the various runway ends.

The general boundary of the flying field 100 is outlined by a number of boundary lamps indicated at 103; while all elevated structures disposed adjacent the boundary of the flying field are provided with hazard lamps indicated at 104. Also flood lamps indicated at 111, 112, 113 and 114 are disposed substantially at the corners of the boundary of the flying field for general illumination purposes. Further, a revolving beacon indicated at 117 is associated with the flying field 100 for the purpose of marking the location of the airport to airplanes aloft; and rotatable T lamps indicated at 115 are disposed upon the flying field for the purpose of signaling wind direction to airplanes aloft. Finally, a number of gates are disposed along the boundary of the flying field to facilitate loading of the airplanes, each of the gates being provided with lamps for illumination purposes. For example, the first gate is provided with gate lamps indicated at 116. Finally, the margins of each runway are provided with rows of flush-type contact lamps in order to mark the boundaries thereof. For example, the margins of the runway R4—R12 are provided with rows of contact lamps indicated at 120.

In order to control airplane traffic upon the runways, each runway end is provided with an arrow and a target, the arrow being of the flush type, visible to an airplane aloft, and the target being of the elevated type, visible only to an airplane on the flying field. For example, the runway ends R1, R4, R12 and R15 are provided respectively with arrows AR1, AR4, AR12 and AR15 and targets TR1, TR4, TR12 and TR15. Preferably, each of the arrows is substantially identical to the arrow AR15, which comprises a red lamp 121 and a green lamp 122 disposed therein; while each of the targets is substantially identical to the target TR15, which comprises a red lamp 123, an amber lamp 124 and a green lamp 125 disposed therein.

In order to control the illumination of the common apparatus comprising the revolving beacon 117, the flood lamps 111, 112, 113 and 114, the T lamps 115, the boundary lamps 103 the hazard lamps 104, and the gate lamps and selectively to control the various arrows and targets individually associated with the runway ends, control apparatus 102 is provided in the dispatcher control tower 101. Also, there are provided in the dispatcher control tower 101 a control panel 300 and an indicator panel 200, the control panel 300 being arranged to govern the control apparatus 102 and the indicator panel 200 being arranged to indicate illumination of the runways and the settings of the various arrows and targets associated with the runway ends. Preferably, the control panel 300 is disposed in a substantially horizontal position on the top of the desk of the dispatcher, while the indicator panel 200 is disposed in either an inclined or a vertical position in front of the desk of the dispatcher, so that the dispatcher may readily operate the apparatus on the control panel 300 and observe upon the indicator panel 200 the illumination of the runways and the settings of the arrows and targets associated with the runway ends on the flying field 100.

Referring now to Fig. 2, the illustrated indicator panel 200 comprises an opaque sheet which is cut out and covered with translucent material in order to provide a general crisscross pattern corresponding precisely to the crisscross pattern of the runways on the flying field 100. Also, the ends of the various strips of translucent material carry a number of characters R1 to R18, inclusive, identifying the corresponding runway ends on the flying field, a number of arrows AR1 to AR18, inclusive, identifying the corresponding arrows associated with the runway ends on the flying field, and a number of targets TR1 and TR18, inclusive, identifying the corresponding targets associated with the runway ends on the flying field. A series of lamps are disposed below each of the translucent strips on the indicator panel which are adapted to be illuminated in accordance with the illumination of the contact lamps disposed along the margins of the corresponding runway on the flying field. For example, the series of lamps 270 are disposed below the strip of translucent material on the indicator panel corresponding to the runway R5—R15. Red and green lamps are disposed below each of the arrows carried by the translucent strips on the indicator panel which are adapted to be illuminated in accordance with the illumination of the red and green lamps in the arrows associated with the corresponding runway ends on the flying field. For example, the arrow AR15 carried by the end R15 of the translucent strip on the indicator panel has disposed therebelow a red lamp 271 and a green lamp 272. Red, amber and green lamps are disposed below each of the targets carried by the translucent strips on the indicator panel which are adapted to be illuminated in accordance with the illumination of the red, amber and green lamps in the targets associated with the corresponding runway ends on the flying field. For example, the target TR15 carried by the end R15 of the translucent strip on the indicator panel has disposed therebelow a red lamp 273, an amber lamp 274 and a green lamp 275.

Further, the indicator panel 200 comprises three groups of pilot lamps individually corresponding to three selector links included in the control apparatus 102. Each group of pilot lamps comprises eighteen pilot lamps individually corresponding to the eighteen runway ends on the flying field. For example, the first group of pilot lamps individually associated with the first selector link in the control apparatus 102 comprises the pilot lamps 201 to 218, inclusive, which respectively correspond to the runway ends R1 to R18, inclusive. Similarly, the first pilot lamp 221 in the second group of pilot lamps individually associated with the second selector link in the control apparatus 102 is individually associated with the first runway end R1; while the first pilot lamp 241 in the third group of pilot lamps individually associated with the third selector link in the control apparatus 102 is individually associated with the runway end R1. It is noted that when one of the selector links in the control apparatus 102 is operated to select one of the runway ends on the flying field, the pilot lamp corresponding to the selected runway end in the group of pilot lamps corresponding to the selected link utilized is illuminated. Accordingly, the illumination of the pilot lamps in the three groups of pilot lamps indicates to the dispatcher the particular runway end which has been selected by a particular selector link in the control apparatus 102.

Referring to Fig. 3, the control panel 300 comprises three groups of keys individually corresponding to the three selector links in the control apparatus 102. For example, the first group of keys comprises the illustrated keys 1K1, 1K2 and 1K3; the second group of keys comprises the illustrated keys 2K1, 2K2 and 2K3; while the third group of keys comprises the illustrated keys 3K1, 3K2 and 3K3. Preferably, the three keys in each of the three groups of keys are connected and arranged to perform similar functions in the respective selector links in the control apparatus 102. For example, the key 1K1 comprises a select-release key for the first selector link; the key 1K2 comprises a take off-land-emergency stop key for the first selector link; while the key 1K3 comprises a traffic on-off-runway and traffic on key for the first selector link.

Also, the control panel 300 comprises a group of common keys, including the keys K1 to K10, inclusive, the keys K1 to K6, inclusive, being arranged to control the illumination of the gate lamps associated with the gates 1 to 6, respectively; the key K7 being arranged to control the illumination of the boundary and hazard lamps; the key K8 being arranged to control the illumination of the T lamps; and the key K9 being arranged to control the illumination of the revolving beacon. Finally, the key K10 is arranged to control the intensity of illumination of the contact lamps disposed along the margins of the various runways on the flying field. More particularly, by manipulating the key K10 the illumination of the contact lamps disposed along the margins of the various runways on the flying field may be varied to three different intensities; namely, normal, dim and bright. Further, a group of pilot lamps 311 to 319, inclusive, is provided on the control panel 300 and individually associated with the keys K1 to K9, respectively, these pilot lamps being so connected and arranged that they are illuminated in accordance with the operation of the respective keys. Also, four keys K11, K12, K13 and K14 are provided on the control panel for the purpose of controlling the illumination of the respective flood lamps 111, 112, 113 and 114. Further, there is provided on the control panel a push button pattern 340 which corresponds precisely to the general criss-cross pattern of the runways on the flying field. Also, the push button pattern 340 comprises eighteen push buttons PR1 to PR18, inclusive, respectively positioned on the pattern 340 in accordance with the positions of the various runway ends on the flying field. More particularly, each of the push buttons is connected and arranged in such a manner that it is operative, when depressed, to cause the amber lamp in the target associated with the corresponding runway end on the flying field to flash and to cause the amber lamp in the target associated with the corresponding end of the translucent strip on the indicator panel to flash. For example, when the push button PR15 is depressed, the amber lamp 124 in the target TR15 associated with the corresponding runway end R15 on the flying field is flashed and the amber lamp 274 in the target TR15 associated with the corresponding end R15 of the translucent strip on the indicator panel is flashed.

Finally, the control panel 300 is provided with a number dial 301 comprising a rotatable finger disk 302 and a finger stop 303, this number dial being of the usual automatic telephone type. The number dial 301 is so connected and arranged that it is operative to control a selected one of the selector links in the control apparatus 102 in order to cause the selected selector link to select any desired one of the runways on the flying field for the purpose of governing the illumination of the contact lamps disposed along the margins of the selected runway and the settings of the signals individually associated with the opposite ends thereof.

Referring now to Figs. 4 to 9, inclusive, the control apparatus 102 comprises certain common equipment associated with the common keys K1 to K10, inclusive, on the control panel 300 and with the three selector links, an impulse receiver unit 700 commonly associated with the three groups of keys on the control panel and three selector links commonly associated with the impulse receiver unit, the first selector link being indicated at 895.

This common equipment comprises a step-down transformer 445, having a primary winding 446 connected by way of a control switch S408 to a source of low voltage A. C. supply 407, and a secondary winding 447 included in the various control circuits governed by the keys on the control panel 300. Also, this common equipment includes a power transformer 610 having a primary winding arranged in three sections 611, 612 and 613, and a secondary winding 614, and two choke coils 615 and 616. The various series of contact lamps 120, 635, 636, etc., disposed along the margins of the runways on the flying field, are adapted to be respectively connected across the secondary winding 614 of the power transformer 610 by a number of slave relays R620, R622, R624, etc.; while the various sections of the primary winding of the power transformer 610 are adapted to be connected in a predetermined manner to a source of high voltage A. C. supply 601 by a control switch S602 and three two-position switches S510, S520 and S530. Each of the two-position switches S510, S520 and S530 is of the heavy duty, double acting, solenoid type, comprising operating and releasing windings. A circuit network is provided for controlling the operating and releasing windings of the two-position switches S510, S520 and S530, which comprises three switch control relays R410, R415 and R420, three lockout relays R425, R430 and R435, and a control relay R450.

Further, the common equipment comprises a group of six gate relays, including the gate relay R550; a group of six gate slave relays, including the gate slave relay R560; a group of eighteen target relays, including the target relay R540; and a group of eighteen target slave relays, including the target slave relay R565. It is noted that the gate relays are individual to the respective gates associated with the flying field, the gate relay R550 being individual to the first gate and being operative to complete a circuit for energizing the gate lamps 116 associated with the first gate; while the target relays are individual to the respective targets associated with the runway ends on the flying field, the target relay R540 being individual to the target TR5 associated with the runway end R5 on the flying field and being operative to complete a circuit for illuminating the amber lamp 130 in the target TR5. Each of the circuits for illuminating the amber lamps in the various targets includes a flasher in order to cause the amber lamp to flash, the circuit for illuminating the amber lamp 130 in the target TR5 including the flasher 553. Also, this common equipment includes a boundary and hazard relay R545 and an associated boundary and hazard slave relay R555, the boundary and hazard relay R545 being operative to complete the circuits for illuminating the boundary and hazard lamps 103 and 104.

It is noted that the gate slave relays are arranged to control the illumination of the group of pilot lamps disposed on the control panel 300, the gate slave relay R560 being arranged to control the illumination of the first pilot lamp 311 in this group of pilot lamps. The boundary and hazard slave relay R555 is arranged to control the illumination of the pilot lamp 317 in the group of pilot lamps on the control panel 300; while the target slave relays are arranged to control the illumination of the amber lamps in the various targets associated with the miniature runways on the indicator panel 200, the target slave relay R565 being arranged to control the illumination of the amber lamp 276 in the target TR5 associated with the miniature runway end R5 on the indicator panel.

Further, the common equipment comprises a group of eighteen take off relays accessible to each of the selector links and individually corresponding to the eighteen runway ends on the flying field, this group including the take off relay R900 individually associated with the runway end R12; a group of eighteen land relays accessible to each of the selector links and individually corresponding to the eighteen runway ends on the flying field, this group including the land relay R905 individually associated with the runway end R12; a group of eighteen emergency stop relays accessible to each of the selector links and individually corresponding to the eighteen runway ends on the flying field, this group including the emergency stop relay R910 individually associated with the runway end R12; and a group of nine contact lamp relays accessible to each of the selector links and individually corresponding to the nine runways on the flying field, this group including the contact lamp relay R915 individual to the runway R4—R12.

It is noted that the various take off, land and emergency stop relays control the illumination of the red and green lamps in the targets and arrows associated with the various runway ends on the flying field; while the various contact lamp relays control the illumination of the various series of contact lamps disposed along the margins of the various runways on the flying field. For example, the take off relay R900 is arranged to control the illumination of the red lamp 144 in the arrow AR12 associated with the runway end R12, the illumination of the green lamp 147 in the target TR4 associated with the runway end R4, and the illumination of the green lamp 142 in the target TR12 associated with the runway end R12; the land relay R905 is arranged to control the illumination of the red lamp 146 in the target TR12 and the illumination of the green lamp 143 in the arrow AR12; the emergency stop relay R910 is arranged to control the illumination of the red lamp 144 in the arrow AR12, the red lamp 140 in the target TR12, and the red lamp 145 in the target TR4; and the contact lamp relay R915 is arranged to control the energization of the slave relay R920, thereby to control the illumination of the series of contact lamps 120 disposed along the margins of the runways R4—R12 on the flying field.

Also, the common equipment comprises a group of eighteen slave relays, including the slave relays R930 and R950, for controlling the illumination of the red lamps in the various targets associated with the miniature runway ends on the indicator panel, the slave relays R930 and R950 being arranged to control the illumination of the red lamps 283 and 290, respectively, in the targets TR12 and TR4; a group of eighteen slave relays, including the slave relays R925 and R945, for controlling the illumination of the green lamps in the various targets associated with the miniature runway ends on the indicator panel, the slave relays R925 and R945 being arranged to control the green lamps 285 and 288, respectively, in the targets TR12 and TR4; a group of eighteen slave relays, including the slave relay R940, for controlling the illumination of the red lamps in the various arrows associated with the miniature runway ends on the indicator panel, the slave relay R940 being arranged to control the red lamp 282 in the arrow AR12; a group of eighteen slave relays, including the slave relay R935, for controlling the illumination of the green lamps in the various arrows associated with the miniature runway ends on the indicator panel, the slave relay R935 being arranged to control the green lamp 281 in the arrow AR12; and a group of nine slave relays, including the slave relay R920, for controlling the illumination of the series of lamps disposed below the translucent strips on the indicator panel, the slave relay R920 being arranged to control the illumination of the series of lamps 275 disposed below the translucent strip R4—R12 on the indicator panel.

The arrangement of the illumination means and the traffic signals with respect to the runways on the flying field, the arrangement of the supervisory apparatus in the dispatcher tower and the connection and arrangement of the control circuit network for the illumination means, the traffic signals and the supervisory apparatus are disclosed and claimed in the copending application of Thomas A. Logan and Imre Molnar, Serial No. 295,344, filed September 16, 1939.

The impulse receiver unit 700 comprises a rotary switch S780, including three wipers 781, 783 and 785 provided with individually associated contact banks 782, 784 and 786 and a magnet M735 for simultaneously driving the wipers noted into engagement with the contacts in the associated contact banks. Also, a set of switch springs S718 is operatively associated with the wipers noted of the rotary switch S780 and arranged to be operated into engagement when the wipers of the rotary switch are operated away from their normal positions. Further, the impulse receiver unit 700 comprises a start relay R740, a hold relay R750, a test relay R730, a switching relay R760, a slave relay R790 and a circuit network.

Preferably, each of the selector links is identical to the illustrated first selector link 895, which comprises a rotary switch S800 including five wipers 801, 803, 805, 807 and 809 provided with individually associated contact banks 802, 804, 806, 808 and 810 and a magnet M880 for driving the wipers noted into engagement with the contacts in the associated contact banks. Also, the selector link 895 comprises a rotary switch S820 including five wipers 821, 823, 825, 827 and 829 provided with individually associated contact banks 822, 824, 826, 828 and 830 and a magnet M885 for driving the wipers noted into engagement with the contacts in the associated contact banks. Further, the selector link 895 comprises a test relay R850, a lockout relay R840, nine marking relays including the relay R890, which individually correspond to the nine runways, relay R860, a switch-through relay R870 and a circuit network. Also, it is noted that the wiper 809 and associated contact bank 810 of the rotary switch S800 are connected and arranged to control the illumination of the pilot lamps in the first group of pilot lamps, including the pilot lamp 212, on the indicator panel.

Before proceeding with a detailed description of the operation of the lighting and traffic control system, a brief explanation of the method of controlling the signals associated with the opposite ends of the various runways on the flying field in order to coordinate the movements of different airplanes is set forth below.

In order to control the take off of an airplane from the flying field 100 the dispatcher in the dispatcher control tower 101 first determines in accordance with the direction of the prevailing wind the particular runway which is to be utilized by the airplane in taking off and the direction of take off on the runway and then views the flying field and the indicator panel 200 in order to satisfy himself that the flying field is clear as far as the determined runway is concerned. The dispatcher then selects the particular one of the three selector links which is to be utilized by operating the select key on the control panel 300 corresponding to the selected link. The dial 391 on the control panel is then operated to cause the selected link to select the determined runway. After the determined runway has been selected, the dispatcher operates the take off key of the selected link on the control panel, thereby to cause the signals associated with the opposite ends of the selected runway to be set in a predetermined manner. More particularly, the target associated with the near end of the selected runway displays a green light; the target associated with the remote end of the selected runway displays a green light; and the arrow associated with the near end of the selected runway displays a red light. The display of the green light by the near target indicates to the pilot in the airplane that he may safely taxi his airplane upon the near end of the selected runway; the display of the green light by the remote target indicates to the pilot in the airplane that his airplane may proceed along the selected runway and take off; while the display of the red light by the near arrow indicates to a pilot in an airplane aloft that the selected runway is in use and that he may not safely land his airplane thereupon.

In order to control the landing of an airplane upon the flying field 100 the dispatcher in the dispatcher control tower 101 proceeds to select one of the runways with a selected one of the links in the previously described manner, and then operates the land key of the selected link on the control panel, thereby to cause the signals associated with the opposite ends of the selected runway to be set in a different predetermined manner. More particularly, the target associated with the near end of the selected runway displays a red light, the target associated with the remote end of the selected runway is dark, and the arrow associated with the near end of the selected runway displays a green light. The display of the red light by the near target indicates to a pilot in an airplane on the flying field that the selected runway is in use and that he may not safely taxi his airplane upon the near end of the selected runway; and the darkened condition of the remote target indicates to a pilot in an airplane on the flying field that the selected runway is in use and that he may not safely take off thereon; while the display of the green light by the near arrow indicates to the pilot in the airplane aloft that the selected runway is in readiness for use to land his airplane thereupon.

Finally, it is noted that the dispatcher in the dispatcher control tower 101, after selecting a runway on the flying field for the use of either an airplane which is to take off thereupon or an airplane which is to land thereupon, may block the actual use of the selected runway by operating the emergency stop key of the selected link on the control panel, thereby to cause the signals associated with the opposite ends of the selected runway to be set in a further predetermined manner. More particularly, the near target displays a red light, the remote target displays a red light, and the near arrow displays a red light. The display of the red light by the near target indicates to a pilot in an airplane on the flying field that he may not safely taxi his airplane upon the near end of the selected runway; the display of the red light by the remote target indicates to a pilot in an airplane upon the near end of the selected runway that his airplane may not safely take off thereupon; while the display of the red light by the near arrow indicates to a pilot in an airplane aloft that he may not safely utilize the selected runway to land his airplane.

In order to conserve time in the handling of airplane traffic, the dispatcher may utilize the push button pattern 340 on the control panel 300, thereby to cause the target associated with any one of the runways to display a flashing amber light. This may be accomplished merely by depressing the particular push button on the push button pattern 340 corresponding to the target associated with the desired runway end on the flying field. This facility is utilized particularly in directing airplanes off of the flying field after they have landed on a selected one of the runways. For example, assuming that an airplane has landed on the runway end R12 on the flying field and is taxiing toward the center intersection, the dispatcher in the dispatcher control tower 101 may operate the push button PR5 on the push button pattern 340 corresponding to the target TR5 associated with the runway end R5 on the flying field, thereby to cause the target TR5 to display a flashing amber light. The display of the flashing amber light by the target TR5 indicates to the pilot in the airplane taxiing along the runway end R12 toward the center intersection that he is to turn into the runway end R5 upon reaching the center intersection, thereby to clear the runway end R12 for the use of other airplanes.

Further, it is noted that the control apparatus 102, the signals on the flying field 100 and the indicator panel 200 are so connected and arranged that, when the dispatcher controls at the control panel 300 the signals associated with the opposite ends of any one of the runways on the flying field to display predetermined indications, the signals associated with the opposite ends of the corresponding runway on the miniature pattern of the flying field on the indicator panel 200 are controlled to display like indications. Accordingly, the signals displayed on the miniature pattern of the flying field on the indicator panel 200 always correspond to the actual signals displayed on the flying field.

Considering now the operation of the control apparatus 102 by the dispatcher in the dispatcher control tower 101, after the dispatcher has determined in accordance with the direction of the prevailing wind on the flying field a particular one of the runways on the flying field for use and the direction of airplane traffic thereon, he selects one of the selector links to be utilized to select the determined runway, as previously noted. Assuming that the dispatcher selects the first selector link 895 to be utilized to select the determined runway on the flying field, this is accomplished by operating the key 1K1 on the control panel 300 to its select position. When the key 1K1 is operated to its select position, a circuit is completed, at the contacts 724 thereof, for energizing in series the upper and lower windings of the lockout relay R840. This circuit extends from ground by way of the contacts 724 of the key 1K1, C795, the upper winding of R840, the contacts 852, the lower winding of R840 and the resistor 876 to battery. It is noted that the point between the terminal of the lower winding of the lockout relay R840 and the resistor 876 is multiplied to the other selector links. Accordingly, the upper and lower windings of the lockout relay R840 are sufficiently energized to cause this relay to operate only in the event the keys corresponding to the key 1K1 in the other selector links occupy their normal positions. Assuming that the above-mentioned condition prevails in the second and third selector links, the upper and lower windings of the lockout relay R840 are sufficiently energized at this time in order to cause the lockout relay R840 to operate. Upon operating, the lockout relay R840 completes, at the contacts 841, an obvious holding circuit for energizing the upper winding thereof and an obvious path for short-circuiting the lower winding thereof, thereby to retain the lockout relay R840 in its operated position and to load the resistor 876. When the resistor 876 is thus loaded by the lockout relay R840 in the first selector link 895, there is not adequate potential between ground and the multiple point to the lockout relays in the second and third selector links to permit operation of the lockout relays in these links. Accordingly, the second and third selector links cannot be utilized while the key 1K1 of the first selector link 895 occupies its select position.

Also, upon operating, the lockout relay R840 prepares, at the contacts 842, a point in a circuit, traced hereinafter, for energizing the upper winding of the test relay R850, prepares at the contacts 843, a point in a circuit, traced hereinafter, for energizing the lower winding of the test relay R850, prepares, at the contacts 844, a point in a circuit, traced hereinafter, for energizing the winding of the magnet M880 of the rotary switch S890, interrupts, at the contacts 845, a point in a circuit, traced hereinafter, for energizing the winding of the magnet M885 on the rotary switch S820, and interrupts, at the contacts 846, a point in a circuit, traced hereinafter, for energizing the winding of the stop relay R860 and for illuminating the pilot lamp arranged in the first group of pilot lamps on the indicator panel 200 and corresponding to the selected runway end on the flying field.

The dispatcher then operates the dial 301 in accordance with the number of the determined runway end on the flying field by inserting his finger in the appropriate hold in the finger disk 302 and then rotating the disk until his finger engages the finger stop 303. The finger disk 302 then returns to its normal position, thereby to cause the dial 301 to transmit a corresponding number of impulses. When the dial 301 is operated away from its normal position the contacts 716 and 717 thereof are actuated into engagement in order respectively to complete a path, traced hereinafter, for short-circuiting the winding of the test relay R730 and to complete a circuit for energizing the winding of the hold relay R750. The circuit for energizing the winding of the hold relay R750 extends from ground by way of the wiper 785 and engaged normal contact in the associated contact bank 786 of the rotary switch S780, C748, the contacts 763, C738, the contacts 717 of the dial 301, the contacts 720 of the key 1KI, C739, the contacts 744, and the winding of R750 to battery. When energized over the above-traced circuit, the hold relay R750 operates to prepare, at the contacts 751, a point in a circuit, traced hereinafter, for energizing the winding of the magnet M735 of the rotary switch S780, to complete, at the contacts 752, an obvious path for applying battery potential by way of the resistor 779 to the conductor C733, to complete. at the contacts 753, an obvious alternative holding circuit for energizing the winding thereof, and to interrupt, at the contacts 754 a point in a circuit, traced hereinafter, for energizing the lower winding of the switching relay R760.

After the finger disk 302 of the dial 301 is released, the dial operates to transmit the corresponding number of impulses, as previously noted. More particularly, the contacts 715 of the dial 301 are operated into engagement and disengagement a number of times corresponding to the number of impulses to be transmitted. Each time the contacts 715 of the dial 301 are actuated into engagement, the previously mentioned circuit for energizing the winding of the magnet M735 of the rotary switch S780 is completed, assuming that the keys 2KI and 3KI individually associated with the second and third selector links occupy their normal positions. The last-mentioned circuit extends from ground by way of the contacts 767 of the key 3KI, C759, the contacts 768 of the key 2KI, C758, the contacts 721 of the key 1KI, C734, the contacts 715 of the dial 301, C732, the contacts 751 and the winding of M735 to battery. Each time the above-traced circuit is completed, the magnet M735 operates to condition the wipers noted of the rotary switch S780 to be driven one step in the clockwise direction; and each time this circuit is interrupted, the magnet M735 restores, thereby to cause the wipers noted of the rotary switch S780 to be driven one step in the clockwise direction. Also, each time the magnet M735 operates, it completes, at the contacts 736, an obvious circuit for energizing the winding of the slave relay R790, thereby to cause this relay to operate. Accordingly, the circuit for energizing the winding of the slave relay R790 is intermittently completed as the magnet M735 operates intermittently; however, the slave relay R790 does not restore during the intermittent restoration of the magnet M735, as this relay is of the slow-to-release type. In fact, the slave relay R790 does not restore until a short time interval following the final restoration of the magnet M735. Upon operating, the slave relay R790 completes, at the contacts 791, the previously mentioned path for short-circuiting the winding of the test relay R730, this path extending from ground by way of the contacts 791, the winding of R730, the contacts 742, C733 and the contacts 716 of the dial 301 to ground. Also, when the wipers noted of the rotary switch S780 are operated away from their normal positions one step in the clockwise direction, the set of switch springs S718 is actuated into engagement, thereby to prepare an alternative circuit, traced hereinafter, for energizing the winding of the magnet M735, this circuit being retained interrupted at the contacts 722 of the key 1KI at this time.

At the conclusion of the first digit the finger disk 302 of the dial 301 occupies its normal position and the contacts 715, 716 and 717 of the dial 301 are operated into disengagement. Also, at this time, the wipers noted of the rotary switch S780 are operated away from their normal positions a predetermined number of steps corresponding to the digit transmitted by the dial 301. When the contacts 717 of the dial 301 are actuated into disengagement, the previously traced circuit for energizing the winding of the hold relay R750 is interrupted thereat; however, the hold relay R750 does not immediately restore, this relay being of the slow-to-release type. Also, when the contacts 716 of the dial 301 are actuated into disengagement the previously traced path for short-circuiting the winding of the test relay R730 is interrupted thereat. When the contacts 715 of the dial 301 are actuated into disengagement the previously traced circuit for energizing the winding of the magnet M735 is interrupted. The subsequent operation of the test relay R730 depends upon several conditions, including the particular digit dialed as will appear hereinafter.

Assuming that the digit dialed at the dial 301 is the digit 1, in this event the wipers noted of the rotary switch S780 are moved into engagement with the first contacts in the associated contact banks after the magnet M735 is deenergized. However, prior to the restoration of the slave relay R790 and subsequent to the return of the finger disk 302 of the dial 301 to its normal position, a circuit is completed for energizing the winding of the test relay R730 in the event the corresponding runway end RI on the flying field has not been previously selected by either the second or the third selector links. This circuit extends from ground by way of the contacts 791, the winding of R730, the contacts 742, C733, the contacts 752 and the resistor 779 to battery. When energized over the above-traced circuit, the test relay R730 operates to complete, at the contacts 731, a circuit for energizing the lower winding of the start relay R740. This circuit extends from ground by way of the contacts 767 of the key 3KI, C759, the contacts 768 of the key 2KI, C758, the contacts 721 of the key 1KI, the contacts 731 and the lower winding of R740 to battery. When energized over the above-traced circuit, the start relay R740 operates to complete, at the contacts 746, an obvious holding circuit for energizing the lower winding thereof. Also, upon operating, the start relay R740 interrupts, at the contacts 744, a further point in the previously traced holding circuit for energizing the winding of the hold relay R750 and prepares, at the contacts 745, a point in a circuit, traced hereinafter, for energizing the upper winding thereof. Further, the start relay R740 interrupts, at the contacts 742, a point in the previously traced circuit for energizing the winding of the test relay R730 and completes, at the contacts 743, an obvious path for applying battery potential by way of the resistor 779 to the conductor C733, and completes, at the contacts 744, an obvious path for applying ground potential to the conductor C778 for a purpose more fully described hereinafter.

Shortly after the magnet M735 restores, the slave relay R790 restores to interrupt, at the contacts 791, a further point in the previously traced circuit for energizing the winding of the test relay R730. Shortly after the previously traced holding circuit for energizing the winding of the hold relay R750 is interrupted, this relay restores to interrupt, at the contacts 751, a further point in the previously traced circuit for energizing the winding of the magnet M735, to interrupt, at the contacts 752, a point in the previously traced original circuit for applying battery potential by way of the resistor 779 to the conductor C733, to interrupt, at the contacts 753, the previously mentioned path for applying ground potential to the conductor C733, and to complete, at the contacts 754, a circuit, traced hereinafter, for energizing the lower winding of the switching relay R760.

At this time the wipers noted of the rotary switch S780 engage the first contacts in the associated contact banks as previously explained. Specifically, the wiper 785 of the rotary switch S780 engages the first contact in the associated contact bank 786, thereby to complete the previously mentioned circuit for energizing the lower winding of the switching relay R760, this circuit extending from ground by way of the wiper 785 and engaged first contact in the associated contact bank 786, C749, the contacts 754 and the lower winding of R760 to battery. When energized over the above-traced circuit, the switching relay R760 operates to complete, at the contacts 766, a holding circuit for energizing the upper winding thereof, this circuit extending from ground by way of the contacts 767 of the key 3K1, C759, the contacts 768 of the key 2K1, C758, the contacts 721 of the key 1K1, C757, the contacts 766 and the upper winding of R760 to battery. Also, upon operating, the switching relay R760 interrupts, at the contacts 761, an obvious connection between the wiper 781 of the rotary switch S780 and the conductor C733, completes, at the contacts 762, an obvious connection between the wiper 783 of the rotary switch S780 and the conductor C733, interrupts, at the contacts 763, a further point in the previously traced original path for applying ground potential by way of the wiper 785 and engaged normal contact in the associated contact bank 786 to the conductor C738, and completes, at the contacts 764, an obvious alternative path for applying ground potential by way of the wiper 785 and engaged first contact in the associated contact bank 786 to the conductor C738. Finally, the switching relay R760 prepares, at the contacts 765, a point in a circuit, traced hereinafter, for energizing the upper winding of the start relay R740. At this time battery potential is applied by way of the resistor 779, the contacts 752, the contacts 762, the wiper 783 and engaged first contact in the associated contact bank 784, C747 and the first conductor in the cable 776 to the first contact in the contact bank 892 of the rotary switch S890 in the first selector link 895. Also, the application of ground potential to the conductor C778 completes a circuit for initiating the operation of the first selector link 895 in a manner more fully described hereinafter.

In the foregoing description it was assumed that the runway end R1 had not been previously selected by either the second or third selector links when the corresponding digit 1 was dialed. Assuming now that when the digit 1 is dialed, the corresponding runway end R1 has been previously selected by either the second or third selector links, the previously traced circuit for energizing the winding of the test relay R730 is not completed when the dial 301 is returned to its normal position. More particularly, in this event, when the dial 301 is returned to its normal position to interrupt, at the contacts 716 thereof, the previously traced path for short-circuiting the winding of the test relay R730, an alternative path for short-circuiting the winding of the test relay R730 is completed. This alternative path for short-circuiting the winding of the test relay R730 extends from ground by way of the contacts 791, the winding of R730, the contacts 742, C733, the contacts 761, the wiper 781 and engaged first contact in the associated contact bank of the rotary switch S780 to the corresponding first conductor in the cable 776, the last-mentioned conductor in the cable 776 having ground potential appearing thereon in a manner more fully described hereinafter. Accordingly, at this time, the test relay R730 does not operate. Hence, after the slave relay R790 and the hold relay R750 restore, only the switching relay R760 occupies its operated position. In view of the fact that the start relay R740 is not operated to complete, at the contacts 741, the previously mentioned path for applying ground potential to the conductor C778, operation of the first selector link 895 is not initiated at this time.

In the foregoing description it was assumed that the first digit dialed at the dial 301 was the digit 1. Assuming now that the first digit dialed is some other digit other than 1 and any digit between 2 and 0, such, for example, as the digit 4, at the conclusion of the digit the finger disk 302 of the dial 301 is returned to its normal position, thereby to interrupt, at the contacts 716, the previously traced path for short-circuiting the winding of the test relay R730. At this time the wipers noted of the rotary switch S780 engage the fourth contacts in the associated contact banks and the previously traced circuit is completed for energizing the winding of the test relay R730 in the event the corresponding runway end R4 on the flying field has not been previously selected by either the second or the third selector links. When thus energized, the test relay R730 operates, as previously explained, thereby to cause the start relay R740 to operate, whereupon operation of the first selector link 895 is initiated, as previously explained.

On the other hand, in the event the runway end R4 has been previously selected by either the second or third selector links, an alternative path for short-circuiting the winding of the test relay R730 is completed when the dial 301 is returned to its normal position. Accordingly, operation of the first selector link 895 is not initiated in this event, as previously explained.

In the foregoing descriptions it was assumed that only one digit was dialed at the dial 301. Assuming now that two digits are to be dialed at the dial 301, the first digit comprising the digit 1 and the second digit comprising any digit between the digits 1 and 8, such, for example, as the digit 2, a first digit 1 and a second digit 2 being dialed when it is desired to select the runway end R12 on the flying field. At the conclusion of the first digit 1 the apparatus in the impulse receiver unit 700 occupies one of two conditions, depending upon whether the corresponding runway R1 on the flying field has been previously selected by either the second or third selector links, as previously explained.

Assuming that the runway end R1 on the flying field has not been previously selected by either the second or third selector links when the first digit 1 is dialed, the apparatus in the impulse receiver unit 700 occupies the condition initially explained and the finger disk 302 of the dial 301 is again actuated in accordance with the digit 2. In this event, when the finger disk 302 of the dial 301 is actuated away from its normal position, the contacts 717 in the dial 301 are actuated into engagement, thereby to complete the previously mentioned circuit for energizing the upper winding of the start relay R740, this circuit extending from ground by way of the wiper 785 and engaged first contact in the associated contact bank 786, C749, the contacts 764, C738, the contacts 717 of the dial 301, C756, the contacts 720 of the key IK1, C739, the contacts 745 and 765 and the upper winding of R740 to battery. When the upper winding of the start relay R740 is energized over the above-traced circuit, the lower winding thereof being energized by way of the previously traced holding circuit, the start relay R740 restores, this relay being of the differential type. Upon restoring, the start relay R740 interrupts, at the contacts 745, the previously traced circuit for energizing the upper winding thereof and interrupts, at the contacts 746, the previously traced holding circuit for energizing the lower winding thereof. Further, the start relay R740 completes, at the contacts 744, the previously traced circuit for energizing the winding of the hold relay R750, thereby to cause the latter relay to operate. Also, the start relay R740 interrupts, at the contacts 743, the previously traced alternative circuit for applying battery potential by way of the resistor 779 to the conductor C733, prepares, at the contacts 742, the previously traced path for short-circuiting the winding of the test relay R730, and interrupts, at the contacts 741, the previously mentioned path for applying ground potential to the conductor C778. Upon operating, the hold relay R750 completes, at the contacts 751, the previously mentioned circuit for energizing intermittently the winding of the magnet M735 of the rotary switch S780 by way of the dial 301.

When the finger disk 302 of the dial 301 is released, the dial 301 operates to transmit a second series of impulses corresponding to the second digit, thereby to cause the magnet M735 to operate intermittently and drive the wipers noted of the rotary switch S780 a corresponding number of additional steps in the clockwise direction. At the conclusion of the second digit the wipers noted of the rotary switch S780 engage contacts in the associated contact banks disposed one step in advance of the number of impulses included in the second digit. At the conclusion of the digit the finger disk 302 of the dial 301 is returned to its normal position, thereby to interrupt, at the contacts 716, the previously traced path for short-circuiting the winding of the test relay R730. At this time the wipers noted of the rotary switch S780 engage the third contacts in the associated contact banks and the previously traced circuit is completed for energizing the winding of the test relay R730 in the event the corresponding runway end R12 on the flying field has not been previously selected by either the second or third selector links.

On the other hand, in the event the runway end R12 has been previously selected by either the second or third selector links, an alternative circuit is completed for short-circuiting the winding of the test relay R730, this circuit extending from ground by way of the contacts 791, the winding of R730, the contacts 742, C733, the contacts 762, the wiper 783 and engaged third contact in the associated contact bank 784 of the rotary switch S780 to the corersponding conductor in the cable 777, this conductor having ground potential appearing thereon, in a manner more fully described hereinafter. Accordingly, in this event, operation of the first selector link 895 is not initiated.

Assuming that the runway end R1 on the flying field has been previously selected, when the digit 1 is dialed the apparatus in the impulse receiver unit 700 occupies the condition explained above and the finger disk 302 of the dial 301 is again actuated in accordance with the digit 2. In this event, when the finger disk 302 of the dial 301 is actuated away from its normal position, the contacts 717 of the dial 301 are actuated into engagement, thereby to complete directly an alternative circuit for energizing the winding of the hold relay R750. This alternative circuit for energizing the winding of the hold relay R750 extends from ground by way of the wiper 785 and engaged first contact in the associated contact bank 786 of the rotary switch S780, C749, the contacts 764, C738, the contacts 717 of the dial 301, C756, the contacts 720 of the key IK1, C739, the contacts 744 and the winding of R750 to battery. When energized over the above-traced circuit, the hold relay R750 operates as previously explained, thereby to render the magnet M735 operative in response to the additional digit transmitted by the dial 301. The subsequent operation of the impulse receiver unit 700 is the same as that previously explained, the operation of the test relay R730 at the conclusion of the second digit 2 being dependent upon whether the runway end R12 on the flying field has been previously selected by either the second or the third selector links, as previously noted.

From the foregoing description of the operation of the impulse receiver unit 700 it is noted that, at the conclusion of any digit or digits dialed at the dial 301, the previously traced circuit for energizing the winding of the test relay R730 is completed only in the event the corresponding runway end on the flying field has not been previously selected by either the second or third selector links. On the other hand, in the event the corresponding runway end on the flying field has been previously selected by the second or third selector links, the previously traced circuit for energizing the winding of the test relay R730 at the conclusion of the digit is not completed in view of the fact that an alternative circuit for short-circuiting the winding of the test relay R730 is completed. As previously noted, this alternative circuit extends from ground by way of the contacts 791, the winding of R730 and the contacts 742 to the conductor C733, from the conductor C733 by way of the contacts 761 to the wiper 781 of the rotary switch S780, or from the conductor C733 by way of the contacts 762 to the wiper 783 of the rotary switch S780, the wiper 781 of the rotary switch S780 engaging a contact in the associated contact bank 782 having ground potential appearing thereon in the event the digit dialed comprises any digit between 1 and 0 and the wiper 783 of the rotary switch S780 engaging a contact in the associated contact bank 782 having ground potential appearing thereon in the event the digit dialed comprises any digit between 11 and 18. The ground potential appearing on the contact in the contact bank 782 engaged by the wiper 781 of the rotary switch S780 is derived by way of the corresponding conductor in the cable 776 from a contact bank in either the second or third selector links corresponding to the contact bank 802 of the rotary switch S800 in the first selector link 895, in the event the corresponding runway end on the flying field has been previously selected by the second or third selector links; and the ground potential appearing on the contact in the contact bank 784 engaged by the wiper 783 of the rotary switch S780 is derived by way of the corresponding conductor in the cable 777 from a contact bank in either the second or third selector links corresponding to the contact bank 802 of the rotary switch S800 in the first selector link 895, in the event the corresponding runway end on the flying field has been previously selected by the second or third selector links. Accordingly, the test relay R730 in the impulse receiver unit 700 is not operated in the event the determined runway end on the flying field has been previously selected by either the second or third selector links. Hence, the start relay R740 in the impulse receiver unit 700 is not operated to initiate operation of the first selector link 895 in this event.

Further, it is noted that, in the event the determined runway end has not been previously selected by the second or third selector links, the operation of the start relay R740 in the impulse receiver unit 700 is effective not only to initiate operation of the first selector link 895, but to mark with battery potential by way of the resistor 779 and the previously traced circuit a particular contact in the contact banks 782 or 784 of the rotary switch S780 corresponding to the determined runway end on the flying field. This marking of the contact in the contact banks 782 or 784 of the rotary switch S780 is effective to control the operation of the first selector link 895 in a manner more fully described hereinafter. Also, it is noted that the impulse receiver unit 700 is so connected and arranged that it is responsive to a second digit after a first digit has been dialed only in the event the first digit dialed is the digit 1.

Continuing now with the operation of the first selector link 895 and assuming that the digits 1 and 2 have been dialed successively, the wipers noted of the rotary switch S780 engage the third contacts in the associated contact banks and the start relay R740 and the switching relay R760 occupy their operated positions. Accordingly, the third contact in the contact bank 784 engaged by the wiper 783 of the rotary switch S780 and corresponding to the twelfth contact in the contact bank 802 of the rotary switch S780 is marked with battery potential, this marking path extending from battery by way of the resistor 779, the contacts 743, C733, the contacts 762, the wiper 783 and engaged third contact in the associated contact bank 784 of the rotary switch S780 and the corresponding conductor in the cable 777 to the twelfth contact in the contact bank 802 of the rotary switch S800. Also, upon operating, the start relay R740 completes, at the contacts 741, the previously mentioned path for applying ground potential to the conductor C778, thereby to initiate operation of the first selector link 895 as previously explained.

More particularly, this application of ground potential to the conductor C778 completes a circuit for energizing the lower winding of the test relay R850 and a multiple circuit for energizing the winding of the magnet M880 of the rotary switch S800. The circuit for energizing the lower winding of the test relay R850 extends from the grounded conductor C778 by way of the contacts 843, the resistor 877 and the lower winding of R850 to battery; and the circuit for energizing the winding of the magnet M880 extends from the grounded conductor C778 by way of the contacts 844, 855 and 881 and the winding of M880 to battery. When the lower winding of the test relay R850 is thus energized, this relay becomes extremely fast to operate when the upper winding thereof is energized. When the winding of the magnet M880 is thus energized, this magnet operates to interrupt, at the contacts 881, the previously traced circuit for energizing the winding thereof, thereby to cause the magnet M880 to restore and recomplete, at the contacts 881, the previously traced circuit for energizing the winding thereof. Accordingly, the magnet M880 operates intermittently, thereby to cause the wipers noted of the rotary switch S880 to be driven step by step in the counterclockwise direction until the wiper 801 engages the twelfth contact in the associated contact bank 802 marked with battery potential as previously explained. When the wiper 801 engages the twelfth contact in the associated contact bank 802 of the rotary switch S800, the previously mentioned circuit for energizing the upper winding of the test relay R850 is completed, this circuit extending from ground by way of the contacts 842, the upper winding of R850, C864 and the wiper 801 to the twelfth contact in the associated contact bank 802, this contact having battery potential appearing thereon. When the upper winding of the test relay R850 is thus energized, this relay operates exceedingly fast to interrupt, at the contacts 855, the previously traced circuit for energizing the winding of the magnet M880, thereby to arrest further operation of the rotary switch S880. Accordingly, at this time, the wipers noted of the rotary switch S880 engage the twelfth contacts in the associated contact banks.

Also, upon operating, the test relay R850 completes, at the contacts 854, an obvious path for short-circuiting the resistor 877, thereby to provide a low resistance holding circuit for the lower winding thereof. Further, the test relay R850 completes, at the contacts 853, an obvious path for applying direct ground potential to the conductor C864, thereby to mark with ground potential by way of the wiper 801 and engaged twelfth contact in the associated contact bank of the rotary switch S800 the corresponding conductor in the cable 777. This application of marking ground potential to the twelfth conductor in the cable 777 marks the corresponding runway end R12 on the flying field against selection by either the second or third selector links. Also, upon operating, the test relay R850 interrupts, at the contacts 852, the previously mentioned path for short-circuiting the lower winding of the lockout relay R840, thereby to render the lockout relay R840 relatively fast to release when the key IKI is operated from its select position back to its normal position. Also, upon operating, the test relay R850 prepares, at the contacts 851, an alternative holding circuit, traced hereinafter, for energizing the lower winding thereof and completes, at the contacts 856, a circuit for energizing the winding of the marking relay R890. The circuit for energizing the winding of the marking relay R890 extends from ground by way of the contacts 856, the wiper 803 and engaged twelfth contact in the associated contact bank 804 of the rotary switch S800, and the winding of R890 to battery. When energized over the above-traced circuit, the marking relay R890 operates to complete, at the contacts 891, 892, etc., obvious paths for applying ground potential by way of the grounded conductor C893 to the fifteen conductors included in the cable 896, for a purpose more fully described hereinafter. Further, the test relay R850 prepares, at the contacts 850, a circuit, traced hereinafter, for energizing the winding of the stop relay R860 in multiple with the pilot lamp 212 in the first group of pilot lamps on the indicator panel 200, and prepares, at the contacts 858, a circuit, traced hereinafter, for energizing the upper winding of the switch-through relay R870.

Also, the test relay R850 completes, at the contacts 857, a path for applying ground potential to the fourth contact in the contact bank 808 of the rotary switch S800, this path extending from ground by way of the contacts 857, C866, the wiper 804 and engaged twelfth contact in the associated contact bank 806 and C878 to the fourth contact in the contact bank 808 of the rotary switch S800. It is noted that ground potential is applied to the fourth contact in the contact bank 808 of the rotary switch S800 in view of the fact that the runway end R4 on the flying field is opposed to the determined runway end R12 thereon. As previously noted, upon operating, the marking relay R890 applies ground potential to the fifteen conductors included in the cable 896, which conductors are terminated by the contacts 1 to 3, inclusive, 5 to 11, inclusive, and 14 to 18, inclusive, in the contact bank 808 of the rotary switch S800, the runway end R3 being an opposing runway end to the determined runway end R12 on the flying field and the runway ends R1, R2, R5 to R11, inclusive, and R14 to R18, inclusive, being intersecting runway ends with respect to the determined runway end R12. Accordingly, at this time, all of the contacts, with the exception of the twelfth and thirteenth contacts in the contact bank 808 of the rotary switch S800 are marked with ground potential due to the fact that the runway end R12 is the determined runway end and the runway end R13 is the only other runway end not conflicting with the determined runway end R12. Further, it is noted that the marked contact in the contact banks 802 and 808 of the rotary switch S800 in the first selector link 805 are multipled to corresponding contacts in the contact banks of corresponding rotary switches in the second and third selector links, thereby to prevent the second and third selector links from seizing trunks associated with conflicting runway ends on the flying field, as will be explained more fully hereinafter.

Finally, upon operating, the test relay R850 prepares, at the contacts 859, a circuit for energizing the winding of the magnet M885 of the rotary switch S820, which circuit is completed when the dispatcher in the dispatcher control tower 101 returns the key IKI of the first selector link 895 from its select position to its normal position. Before the dispatcher in the dispatcher control tower 101 returns the key IKI from its select position to its normal position, he first operates the keys IK2 and IK3, the key IK2 being operated in accordance with the use to be made of the determined runway end R12 and the key IK3 being operated in accordance with the visual condition of the flying field. In the event the flying field is clearly visible and illumination of the contact lamps disposed along the margins of the runway R4—R12 is not required, the key IK3 is operated to its traffic-on position. On the other hand, in the event the flying field is not clearly visible and illumination of the contact lamps disposed along the margins of the runway R4—R12 is required, the key IK3 is operated to its runway and traffic-on position.

Assuming that the flying field is clearly visible and that the determined runway R12 is to be used by an airplane taking off, the key IK3 is operated to its traffic on position and the key IK2 is retained in its take off position. After the keys IK2 and IK3 have been thus operated, the key IKI is returned from its select position to its normal position. When the key IKI is returned to its normal position, the previously traced holding circuit for energizing the upper winding of the lockout relay R840 is interrupted, at the contacts 724 of the key IKI, thereby to cause the lockout relay R840 to restore. Also, when the key IKI is returned to its normal position, the previously mentioned alternative holding circuit for energizing the lower winding of the test relay R850 is completed, this circuit extending from ground by way of the contacts 723 of the key IKI, C769, the contacts 725 of the key IKI, C794, the contacts 851 and the lower winding of R850 to battery. Also, when the key IKI is returned to its normal position, the previously traced holding circuits for energizing in multiple the lower winding of the start relay R740 and the upper winding of the switching relay R760 are interrupted, thereby to cause these relays to restore. Further, when the key IKI is returned to its normal position, the previously mentioned alternative circuit for energizing the winding of the magnet M735 is completed, this circuit extending from ground by way of the contacts 767 of the key 3KI, C759, the contacts 768 of the key 2KI, C758, the contacts 722 of the key IKI, the set of switch springs S718, the contacts 737 and the winding of M735 to battery. When energized over the above-traced circuit, the magnet M735 operates to interrupt, at the contacts 737, the previously traced alternative circuit for energizing the winding thereof, thereby to cause magnet M735 to restore and recomplete, at the contacts 737, the previously traced circuit for energizing the winding thereof. Accordingly, the magnet M735 operates intermittently in order to drive the wipers noted of the rotary switch S780 in the clockwise direction back into their normal positions, whereupon the set of switch springs S718 is actuated into disengagement, thereby to arrest further operation of the magnet M735. At this time the impulse receiver unit 700 is completely released and is available for use by the second and third selector links.

Upon restoring, the lockout relay R840 interrupts, at the contacts 841, a further point in the previously traced circuit for energizing the upper winding thereof, interrupts, at the contacts 842, the previously mentioned path for short-circuiting the upper winding of the test relay R850, interrupts, at the contacts 843, a further point in the previously traced original holding circuit for energizing the lower winding of the test relay R850, interrupts, at the contacts 844, a further point in the previously traced circuit for energizing the winding of the magnet M880 of the rotary switch S800, and completes, at the contacts 846, the previously mentioned circuit for illuminating the pilot lamp 212 in the first group of pilot lamps on the indicator panel 200. The circuit for illuminating the pilot lamp 212 extends from ground by way of the contacts 850 and 846, C868, the wiper 809 and engaged twelfth contact in the associated contact bank 810 of the rotary switch S800, the twelfth conductor in the cable 811 and the pilot lamp 212 to battery. The illumination of the pilot lamp 212 in the first group of pilot lamps on the indicator panel 200 indicates to the dispatcher in the dispatcher control tower 101 that the first selector link 895 has operated to select the determined runway R12. After the lockout relay R840 is released, the load upon the resistor 876 is removed, thereby to render the lockout relays in the second and third selector links operative in order to render these links usable.

Finally, upon restoring, the lockout relay R840 completes, at the contacts 845, the previously mentioned circuit for energizing the winding of the magnet M885 of the rotary switch S820. This circuit extends from ground by way of the contacts 859, 862, 845 and 886 and the winding of M885 to battery. When energized over the above-traced circuit, the magnet M885 operates to interrupt, at the contacts 886, the above-traced circuit for energizing the winding thereof, thereby to cause the magnet M885 to restore and recomplete, at the contacts 886, the above-traced circuit for energizing the winding thereof. Accordingly, the magnet M885 operates intermittently, thereby to drive the wipers noted of the rotary switch S820 step by step in the clockwise direction until the wiper 829 engages the twelfth contact in the associated contact bank, whereupon a circuit is completed for energizing the winding of the stop relay R860. This circuit extends from ground by way of the contacts 850 and 846, C868, the wiper 809 and engaged twelfth contact in the associated contact bank 810 of the rotary switch S800, the twelfth conductor in the cable 811, the wiper 829 and engaged twelfth contact in the associated contact bank 830 of the rotary switch S820 and the winding of R860 to battery. When energized over the above-traced circuit, the stop relay R860 operates to interrupt, at the contacts 862, the previously traced circuit for energizing the winding of the magnet M885, thereby positively to arrest the operation of the rotary switch S820. At this time the rotary switch S820 has operated to select the trunk including the control circuits of the take off relay R900, the land relay R905, the emergency stop relay R910 and the contact lamp relay R915, these relays being associated with the runway end R12 on the flying field. Although the rotary switch S820 has selected the trunk mentioned it does not seize this trunk until the switch-through relay R870 tests this trunk to determine whether it is marked against seizure.

More particularly, upon operating, the stop relay R860 completes, at the contacts 863, a circuit for energizing the lower winding of the switch-through relay R870, this circuit extending from ground by way of the contacts 859 and 863 and the lower winding of R870 to battery. Further, the stop relay R860 prepares, at the contacts 861, a circuit for energizing the upper winding of the switch-through relay R870, the last-mentioned circuit being completed only in the event ground potential appears upon the twelfth contact in the contact bank 808 engaged by the wiper 807 of the rotary switch S800. In the event ground potential appears upon the contacts mentioned in the contact bank 808 of the rotary switch S800 engaged by the wiper 807, the circuit is completed for energizing the upper winding of the switch-through relay R870, this circuit extending from the grounded wiper 807 by way of C867, the contacts 858, 861 and 875 and the upper winding of R870 to battery. Accordingly, it will be understood that in the event the second or third selector links has previously selected a runway end conflicting with the selected runway end R12, ground potential will appear upon the twelfth contact in the contact bank 808 of the rotary switch S800, thereby to cause the previously traced circuit for energizing the upper winding of the switch-through relay R870 to be completed, while the previously traced circuit for energizing the lower winding thereof is completed. The switch-through relay R870 is of the differential type and will not operate when both the lower and upper windings thereof are energized. On the other hand, in the event the second and third selector links have not previously selected a runway end conflicting with the selected runway R12, no ground potential appears upon the twelfth contact in the contact bank 808 engaged by the wiper 807 of the rotary switch S800, when the previously mentioned circuit for energizing the lower winding of the switch-through relay R870 is completed. Accordingly, the switch-through relay operates, as only the lower winding thereof is energized. At this point it is noted that, in the event the switch-through relay R870 does not operate, the control circuits, traced hereinafter, included in the selected trunk and extending between the keys IK2 and IK3 and the relays R900, R905, R910, etc., in the common equipment cannot be completed, while certain of these control circuits are automatically completed in the event the switch-through relay R870 operates.

Assuming that the switch-through relay R870 operates, upon operating, it completes a circuit for energizing the winding of the land relay R905 in the common equipment, the relay R905 in the common equipment being individual to the selected runway end R12 on the flying field. The circuit for energizing the winding of the land relay R905 extends from the conductor C441 by way of the winding of R905, the wiper 823 and engaged twelfth contact in the associated contact bank 824 of the rotary switch S820, the contacts 872, C791, the contacts 703 of the key IK2, C705, the contacts 702 of the key IK2, C712, the contacts 710 of the key IK3, C711, and the contacts 719 of the key IK1 to the conductor C440, the conductors C441 and C440 being connected to the terminals of the secondary winding 447 of the transformer 445. The terminals of the primary winding 446 of the transformer 445 are connected to the conductors C406 and C407 which extend by way of the switch C408 to the source of low voltage A. C. supply 407, the switch S408 being closed at this time. As previously noted, the transformer 445 is of the step-down type, thereby to cause the voltage impressed between the conductors C441 and C440 to be a relatively low voltage in order to prevent injurious arc-overs between the contacts of the keys IK1, IK2, and IK3 incident to the various operations of these keys. When the land relay R905 is energized over the above-traced circuit, it operates in order to complete certain signal circuits associated with the selected runway R12 in a manner more fully described hereinafter.

From the foregoing description of the operation of the impulse receiver unit 700 and the first selector link 895, it will be understood that, after the digit or digits have been dialed at the dial 301 and into the impulse receiver unit 700, operation of the first selector link 895 is initiated only in the event that the determined runway end had not been previously selected by the second or third selector links. Further, it will be understood that, after operation of the first selector link 895 is initiated, this link is operative to select the control apparatus individually associated with the selected runway. However, the first selector link 895 is effective to seize the selected control apparatus only in the event that the second and third selector links have not previously seized the control apparatus associated with a conflicting runway.

Continuing now with the operation of the control apparatus individually associated with the selected runway R12, upon operating, the land relay R905 completes at the contacts 906, a circuit for illuminating the red lamp 140 in the target TR12 individually associated with the selected runway end R12, this circuit extending from the conductor C407 of the low voltage source of A. C. supply by way of the contacts 906, C652 and the lamp 140 to the conductor C406 of the low voltage source of A. C. supply. Also, the land relay R905 completes, at the contacts 907, a circuit for energizing the green lamp 143 in the arrow AR12 individually associated with the selected runway end R12, this circuit extending from the conductor C407 of the source of A. C. supply by way of the contacts 907, C651, and the green lamp 143 to the conductor C406 of the source of A. C. supply. Accordingly, at this time, the target TR12 displays a red light to the runway end R12 and the arrow AR12 displays a green light to the runway end R12 for the purposes previously mentioned. Further, it is noted that when the circuit for illuminating the red lamp 140 in the target TR12 is completed, a multiple circuit for energizing the winding of the slave relay R930 is completed, this circuit extending from the conductor C407 of the source of A. C. supply by way of the contacts 906, C652 and the winding of R930 to the conductor C406 of the source of A. C. supply; and when the circuit for illuminating the green lamp 143 in the arrow AR12 is completed, a multiple circuit is also completed for energizing the winding of the slave relay R935, this circuit extending from the conductor C407 of the source of A. C. supply by way of the contacts 907, C651 and the winding of R935 to the conductor C406 of the source of A. C. supply. Accordingly, the slave relays R930 and R935 operate at this time. Upon operating, the slave relay R930 completes, at the contacts 931, an obvious circuit for illuminating the red lamp 283 disposed behind the target TR12 on the miniature pattern of the flying field on the indicator panel 200; and, upon operating, the slave relay R935 completes, at the contacts 936, an obvious circuit for illuminating the green lamp 281 disposed behind the arrow AR12 on the miniature pattern of the flying field on the indicator panel 200. Accordingly, at this time, the target TR12 and the arrow AR12 on the miniature pattern of the flying field on the indicator panel 200 are illuminated in accordance with the illumination of the target TR12 and the arrow AR12 associated with the runway end R12 on the flying field. Further, it is noted that the intensity of illumination of the lamps 281, 282, etc., may be varied by adjusting the resistor 465, the circuit for illuminating the lamp 281 extending from one terminal of the secondary winding 447 of the transformer 445 by way of C441, the contacts 936, the lamp 281, the conductor C466, the adjustable resistor 465 and the conductor C440 to the other terminal of the secondary winding 447 of the transformer 445.

In the event the dispatcher at the dispatcher control tower 101 desires to control the taking off of an airplane from the selected runway end R12 on the flying field, it is only necessary for him to operate the key IK2 from its land position to its take off position. When the key IK2 is operated from its land position, the previously traced circuit for energizing the winding of the land relay R905 is interrupted, at the contacts 702 thereof, thereby to cause the land relay R905 to restore. Also, when the key IK2 is operated to its take off position, a circuit is completed for energizing the winding of the take off relay R900 individually associated with the selected runway end R12 on the flying field, this circuit extending from the conductor C441 by way of the winding of R900, the wiper 821 and engaged twelfth contact in the associated contact bank 822 of the rotary switch S820, the contacts 871, C790, the contacts 701 of the key IK2, C712, the contacts 710 of the key IK3, C711 and the contacts 719 of the key IK1 to the conductor C440, the conductors C441 and C440 being connected to the secondary winding 447 of the transformer 445. When the take off relay R900 is thus energized, it operates.

Upon restoring, the land relay R905 interrupts, at the contacts 906, the previously traced circuits for illuminating the red lamp 140 in the target TR12 and for energizing the winding of the slave relay R930, and interrupts, at the contacts 907, the previously traced circuits for illuminating the green lamp 143 in the arrow AR12 and for energizing the winding of the slave relay R935. The slave relays R930 and R935 then restore to interrupt the previously mentioned circuits for illuminating the red lamp 283 disposed behind the target TR12 and the green lamp 281 disposed behind the arrow AR12 on the miniature pattern of the flying field on the indicator panel 200.

Upon operating, the take off relay R900 completes, at the contacts 901, a circuit for illuminating the red lamp 144 in the arrow AR12, this circuit extending from the conductor C407 of the source of A. C. supply by way of the contacts 901, C655 and the lamp 144 to the conductor C406 of the source of A. C. supply; completes, at the contacts 902, a circuit for illuminating the green lamp 147 in the target TR4 individually associated with the runway end R4 opposing the selected runway end R12, this circuit extending from the conductor C407 of the source of A. C. supply by way of the contacts 902, C654 and the lamp 147 to the conductor C406 of the source of A. C. supply; and complete, at the contacts 903, a circuit for illuminating the green lamp 142 in the target TR12, this circuit extending from the conductor C407 of the source of A. C. supply by way of the contacts 903, C653 and the lamp 142 to the conductor C406 of the source of A. C. supply. When the above-traced circuits, respectively including the conductors C653, C654 and C655, are completed, obvious circuits for energizing the windings of the slave relays R925, R945 and R940 are respectively completed, thereby to cause these slave relays to operate.

Upon operating, the slave relay R925 completes, at the contacts 926, an obvious circuit for illuminating the green lamp 285 disposed behind the target TR12 on the miniature pattern of the flying field on the indicator panel 200; upon operating, the slave relay R940 completes, at the contacts 941, an obvious circuit for illuminating the red lamp 282 disposed behind the arrow AR12 on the miniature pattern of the flying field on the indicator panel; and, upon operating, the slave relay R945 completes, at the contacts 946, an obvious circuit for illuminating the green lamp 288 disposed behind the target TR4 on the miniature pattern of the flying field on the indicator panel.

Accordingly, at this time, the targets TR4 and TR12 and the arrow AR12 on the miniature pattern of the flying field on the indicator panel 200 are illuminated in accordance with the illumination of the target TR12 and the arrow AR12 associated with the runway end R12 and the target TR4 associated with the runway end R4 on the flying field.

In the event the dispatcher in the dispatcher control tower 101 desires to block the take off of an airplane upon the selected runway R12, it is only necessary for him to operate the key IK2 from its take off position to its emergency stop position. When the key IK2 is operated from its take off position, the previously traced circuit for energizing the winding of the take off relay R900 is interrupted, at the contacts 701 thereof, thereby to cause the take off relay R900 to restore. Also, when the key IK2 is operated to its emergency stop position, a circuit is completed for energizing the winding of the emergency stop relay R910 individually associated with the selected runway end R12 on the flying field, this circuit extending from the conductor C441, the winding of R910, the wiper 825 and engaged twelfth contact in the associated contact bank 826 of the rotary switch S820, the contacts 873, C792, the contacts 704 of the key IK2, C705, the contacts 702 of the key IK2, C712, the contacts 710 of the key IK3, C711, and the contacts 719 of the key IK1 to the conductor C440, the conductors C441 and C440 being connected to the secondary winding 447 of the transformer 445. When the emergency stop relay R910 is thus energized, it operates.

Upon restoring, the take off relay R900 interrupts, at the contacts 901, the previously traced circuits for illuminating the red lamp 144 in the arrow AR12 and for energizing the winding of the slave relay R940, interrupts, at the contacts 902, the previously traced circuits for illuminating the green lamp 147 in the target TR4 and for energizing the winding of the slave relay R945, and interrupts, at the contacts 903, the previously traced circuits for illuminating the green lamp 142 in the target TR12 and for energizing the winding of the slave relay R925. The slave relays R925, R940 and R945 then restore to interrupt the previously mentioned circuits for illuminating the green lamp 285 disposed behind the target TR12, the red lamp 282 disposed behind the arrow AR12, and the green lamp 288 disposed behind the target TR4 on the miniature pattern of the flying field on the indicator panel 200.

Upon operating, the emergency stop relay R910 completes, at the contacts 911, a circuit for illuminating the red lamp 144 in the arrow AR12, this circuit extending from the conductor C407 of the source of A. C. supply by way of the contacts 911, C655 and the lamp 144 to the conductor C406 of the source of A. C. supply; completes at the contacts 912, a circuit for illuminating the red lamp 140 in the target TR12, this circuit extending from the conductor C407 of the source of A. C. supply by way of the contacts 912, C652 and the lamp 140 to the conductor C406 of the source of A. C. supply; and completes, at the contacts 913, a circuit for illuminating the red lamp 145 in the target TR4, this circuit extending from the conductor C407 of the source of A. C. supply by way of the contacts 913, C904, C650 and the lamp 145 to the conductor C406 of the source of A. C. supply. When the above-traced circuits respectively including the conductors C655, C652 and C650 are completed, obvious circuits for energizing the windings of the slave relays R940, R930 and R950 are completed, thereby to cause these slave relays to operate.

Upon operating, the slave relay R940 completes, at the contacts 941, an obvious circuit for illuminating the red lamp 282 disposed behind the arrow AR12 on the miniature pattern of the flying field on the indicator panel 200; upon operating the slave relay R930 completes, at the contacts 931, an obvious circuit for illuminating the red lamp 283 disposed behind the target TR12 on the miniature pattern of the flying field on the indicator panel; and, upon operating, the slave relay R950 completes, at the contacts 951, an obvious circuit for illuminating the red lamp 290 disposed behind the target TR4 on the miniature pattern of the flying field on the indicator panel.

Accordingly, at this time, the targets TR4 and TR12 and the arrow AR12 on the miniature pattern of the flying field on the indicator panel are illuminated in accordance with the illumination of the target TR12 and the arrow AR12 associated with the runway end R12 and the target TR4 associated with the runway end R4 on the flying field.

From the foregoing description of the operation of the key IK2 it will be understood that the dispatcher in the dispatcher control tower 101 may readily block the landing of an airplane aloft upon the selected runway end R12 merely by operating the key IK2 from its land position to its emergency stop position, thereby to cause the land relay R905 to restore and the emergency stop relay R910 to operate, as previously explained.

In view of the above description it will be apparent that the dispatcher in the dispatcher control tower 101 may selectively control the signals associated with the selected runway end R12 and the opposing runway end R4 on the flying field in order to control airplane traffic on the runway end R12 by appropriately operating the key IK2, as desired.

As previously noted, an arrangement is provided for directing an airplane after it has landed upon the selected runway end off of the selected runway end onto some other runway in order to facilitate the handling of airplane traffic. For example, after an airplane has landed on the runway end R12, it may be desirable to direct the airplane taxiing along this runway therefrom onto the runway end R5. In order to accomplish this result the dispatcher at the dispatcher control tower 101 depresses the push button PR5 on the push button pattern 340 on the control panel 300, thereby to complete an obvious circuit for energizing the winding of the target relay R540. When thus energized, the target relay R540 operates to complete, at the contacts 541 and 542, a circuit for intermittently illuminating the amber lamp 130 in the target TR5 individually associated with the runway end R5 on the flying field and for intermittently energizing the winding of the target slave relay R565. The circuit for intermittently illuminating the amber lamp 130 in the target TR5 extends from the conductor C406 of the source of A. C. supply by way of the contacts 542, C576, the flasher 553, C575, the amber lamp 130, C574 and the contacts 541 to the conductor C407 of the source of A. C. supply; and the circuit for intermittently energizing the winding of the target slave relay R565 extends from the conductor C406 of the source of A. C. supply by way of the previously traced circuit to the conductor C575 and from the conductor C407 of the source of A. C. supply by way of the previously traced circuit to the conductor C574, the winding of the target slave relay R565 being connected across the conductors C574 and C575. The flasher 553 operates to cause the circuit for illuminating the amber lamp 130 and the circuit for energizing the winding of the target slave relay R565 to be completed intermittently. Accordingly, the amber lamp 130 in the target TR5 flashes and the target slave relay R565 operates intermittently. Each time the target slave relay R565 operates, it completes, at the contacts 566, a circuit for illuminating the amber lamp 276 disposed behind the target TR5 on the miniature pattern of the flying field on the indicator panel 200, this circuit extending from the conductor C441 by way of the contacts 566, C577, the lamp 276, the conductor C466 and the resistor 465 to the conductor C440, the conductors C441 and C440 being connected across the secondary winding 447 of the transformer 445. Accordingly, the amber lamp 276 disposed behind the target TR5 on the miniature pattern of the flying field on the indicator panel 200 flashes in accordance with the flashing of the amber lamp 130 in the target TR5 associated with the runway end R5 on the flying field.

In order to arrest flashing of the amber lamp 130 in the target TR5, the dispatcher in the dispatcher control tower 101 allows the push button PR5 to be returned to its normal position, whereupon the previously mentioned circuit for energizing the target relay R540 is interrupted. The target relay R540 then restores to interrupt, at the contacts 541 and 542, the previously traced circuit for illuminating the amber lamp 130 in the target TR5 and for energizing the winding of the target slave relay R565. The target slave relay R565 then restores to interrupt, at the contacts 566, the previously traced circuit for illuminating the amber lamp 276 disposed behind the target TR5 on the miniature pattern of the flying field on the indicator panel 200. Accordingly, it will be understood that the indicator panel 200 is connected and arranged to display a signal corresponding to the actual signal displayed on the flying field.

In the event the flying field is not clearly visible, the key IK3 is operated from its off position to its runway and traffic on position instead of from its off position to its traffic on position, as previously explained. When the key IK3 is operated to its runway and traffic on position, the control of the signals associated with the runway ends R4 and R12 by the key IK2 is the same as that previously explained. However, at this time, when the key IK3 is operated to its runway and traffic on position, the illumination of the contact lamps disposed along the margins of the runway R4—R12 are controlled. More particularly, when the key IK3 is operated to its runway and traffic on position, a circuit is completed for energizing the winding of the contact lamp relay R915 commonly associated with the selected runway end R12 and the opposing runway end R4, this circuit extending from the conductor C441 by way of the winding of R915, the wiper 827 and engaged twelfth contact in the associated contact bank 828 of the rotary switch S820, the contacts 874, C793, the contacts 707 of the key IK3, C711 and the contacts 719 of the key IK1 to the conductor C440, the conductors C441 and C440 being connected to the terminals of the secondary winding 447 of the transformer 445.

When energized over the above-traced circuit, the contact lamp relay R915 operates to complete, at the contacts 916 and 917, obvious multiple circuits for energizing the windings of the slave relays R920 and R620 by way of the conductors C406 and C407 of the source of A. C. supply, thereby to cause these relays to operate. Upon operating, the slave relay R620 completes, at the contacts 621, an obvious circuit for energizing the contact lamps 120 disposed along the margins of the runway R4—R12 on the flying field, including the secondary winding 614 of the power transformer 610. Upon operating, the slave relay R920 completes, at the contacts 921, an obvious circuit for energizing the series of lamps 275 disposed below the translucent strip R4—R12 of the miniature pattern of the flying field on the indicator panel 200. Accordingly, at this time, the translucent strip R4—R12 on the miniature pattern of the flying field on the indicator panel is illuminated in order to indicate that the runway R4—R12 on the flying field is illuminated.

It is noted that an arrangement is provided for varying the intensity of illumination of the contact lamps disposed along the margins of the runways on the flying field. More particularly, when the switch S408 connected to the source of A. C. supply 407 is closed prior to the operation of the key IK3 from its off position to its runway and traffic on position, a circuit is completed for energizing the winding of the control relay R450 and the switch control relay R415. The circuit for energizing the winding of the control relay R450 extends from the conductor C441 by way of the winding of R450, C409, the contact illustrated of the key 2K2, C713, the contact illustrated of the key 3K2, C714 and the contact 706 of the key IK3 to the conductor C440, the conductors C441 and C440 being connected across the terminals of the secondary winding 447 of the transformer 445. The circuit for energizing the winding of the switch control relay R415 extends from the conductor C441 by way of the winding of R415, the contacts 403 of the key K10, C464 and the contacts 402 of the key K10 to the conductor C440, the conductors C441 and C440 being connected to the terminals of the secondary winding 447 of the transformer 445. When thus energized, the control relay R450 and the switch control relay R415 operate. Upon operating, the control relay R450 prepares, at the contacts 451, circuits for energizing the operating and release windings of the switches S510, S520 and S530. Upon operating, the switch control relay R415 completes, at the contacts 416, a circuit for energizing the operating winding W521 of the switch S520, this circuit extending from the conductor C406 of the source of A. C. supply by way of the contacts 451, 416, 427 and 436, C457 and the winding W521 to the conductor C407 of the source of A. C. supply. When the winding W521 of the switch S520 is energized over the above-traced circuit, this switch operates to complete, at the contacts 524, an obvious circuit for energizing the winding of the lockout relay R430, hereby to cause this relay to operate. Upon operating, the lockout relay R430 interrupts, at the contacts 431, a point in a circuit, traced hereinafter, for energizing the operating winding W511 of the switch S510 and interrupts, at the contacts 432, a point in a circuit, traced hereinafter, for energizing the operating winding W531 of the switch S530.

Also, upon operating, the switch S520 completes, at the contacts 523, a circuit for energizing in series the winding sections 611 and 612 of the primary winding of the power transformer 610, assuming that the switch S602 is closed, this circuit extending from one terminal of the high voltage source of A. C. supply 601 by way of C518, the contacts 523, C516, the choke coil 616, the sections 612 and 611 of the primary winding of the power transformer 610 and the switch S602 to the other terminal of the high voltage source of A. C. supply. Accordingly, two of the sections of the primary winding of the power transformer 610 are normally encircuited in the source of high voltage A. C. supply 601, thereby to cause the secondary winding 614 of the power transformer 610 to produce a normal voltage which is effective to cause the contact lamps disposed along the margins of the runways to be illuminated to normal intensity.

Further, it is noted that, when the key IK3 is operated away from its normal position to its runway and traffic on position, the previously traced circuit for energizing the winding of the control relay R450 is interrupted at the contacts 706 thereof, thereby to cause this relay to restore. Upon restoring, the control relay R450 interrupts, at the contacts 451, the previously traced circuit for energizing the operating winding of the switch S520 and the previously mentioned circuits for energizing the operating windings of the switches S510 and S530. Furthermore, upon restoring, the control relay R450 interrupts, at the contacts 451, circuits, traced hereinafter, for energizing the release windings of the switches S510, S520 and S530, thereby to prevent further operation or release of these switches while the key IK3 is operated to its runway and traffic on position. This arrangement positively prevents the connections of the primary winding of the power transformer winding 610 from being altered while the secondary winding of this transformer is loaded, thereby to minimize the currents which must be interrupted when one of the switches S510, S520 or S530 restores.

Assuming now that the key IK3 has been operated from its runway and traffic on position to its off position and that it is desirable to alter the intensity of illumination of the contact lamps disposed along the margins of the runways on the flying field, this may be accomplished by appropriately operating the key K10. For example, in order to render the contact lamps illuminated to a bright intensity, when they are connected across the secondary winding of the power transformer winding 610, the key K10 is operated from its normal position to its bright position. When the key K10 is operated from its normal position, the previously traced circuit for energizing the winding of the switch control relay R415 is interrupted at the contacts 402 thereof; and when the key K10 is operated to its bright position, an obvious circuit is completed for energizing the winding of the switch control relay R420 at the contacts 401 thereof. The switch control relay R415 then restores and the switch control relay R420 then operates. Upon restoring, the switch control relay R415 interrupts, at the contacts 416, the previously traced circuit for energizing the operating winding W521 of the switch S520 and completes, at the contacts 417, a circuit for energizing the release winding W522 of the switch S520. The circuit for energizing the release winding W522 of the switch S520 extends from the conductor C407 of the source of A. C. supply by way of the winding W522, C458 and the contacts 417 and 451 to the conductor C406 of the source of A. C. supply. When the release winding W522 of the switch S520 is thus energized, the switch S520 is released, thereby to interrupt, at the contacts 523, the previously traced circuit for energizing the sections 612 and 611 of the primary winding of the power transformer 610 and to interrupt, at the contacts 524, the previously traced circuit for energizing the winding of the lockout relay R430. The lockout relay R430 then restores to prepare, at the contacts 431, the previously mentioned circuit for energizing the operating winding W511 of the switch S510 and to prepare, at the contacts 432, the previously mentioned circuit for energizing the operating winding W531 of the switch S530.

Upon operating, the switch control relay R420 interrupts, at the contacts 422, a point in a circuit, traced hereinafter, for energizing the release winding W512 of the switch S510 and completes, at the contacts 421, the previously mentioned circuit for energizing the operating winding W511 of the switch S510, this circuit extending from the conductor C407 of the source of A. C. supply by way of the winding W511, C455 and the contacts 431, 426, 421 and 451 to the conductor C406 of the source of A. C. supply. When the operating winding W511 of the switch S510 is thus energized, the switch S510 operates to complete, at the contacts 514, an obvious circuit for energizing the winding of the lockout relay R435. The lockout relay R435 then operates to interrupt, at the contacts 436, a further point in the previously traced circuit for energizing the operating winding W521 of the switch S520 and interrupts, at the contacts 437, a point in the previously mentioned circuit for energizing the operating winding W531 of the switch S530.

Also, the switch S510 completes, at the contacts 513, a circuit for energizing the sections 611, 612 and 613 of the primary winding of the power transformer 610, this circuit extending from one terminal of the high voltage source of A. C. supply 601 by way of C518, the contacts 513, C515, the sections 613, 612 and 611 of the primary winding of the power transformer 610 and the switch S602 to the other terminal of the high voltage source of A. C. supply. At this time the three sections of the primary winding of the power transformer 610 are encircuited, thereby to cause the secondary winding 614 of this transformer to produce an above-normal voltage.

In view of the foregoing description of the operation of the switches S520 and S510, it will be understood that the switch S530 may be operated in a similar manner by operating the key K10 from its normal position to its dim position, thereby to cause only the choke coil 615 and section 611 of the primary winding of the power transformer 610 to be encircuited, whereupon the secondary winding 614 of the power transformer 610 is effective to produce an under normal voltage. It will be readily understood that the intensity of illumination of the contact lamps connected across the secondary winding 614 of the power transformer 610 will be determined in accordance with the voltage produced by the secondary winding. Accordingly, the intensity of illumination of the contact lamps may be governed by appropriately controlling the connections of the primary winding of the power transformer 610 through the switches S510, S520 and S530 under the control of the key K10.

Also, in the event that the flying field is not clearly visible, it is necessary to illuminate the boundary lamps 103, the hazard lamps 104, the T lamps 115, the revolving beacon 117 and the flood lamps 111, 112, 113 and 114. In order to accomplish these ends, the corresponding keys K7, K8, K9, K11, K12, K13 and K14 are operated from their off positions to their on positions, thereby to cause the lamps controlled thereby to be illuminated. For example, when the boundary and hazard key K7 is operated from its off position to its on position, an obvious circuit is completed for energizing the boundary and hazard relay R545, thereby to cause this relay to operate and complete, at the contacts 546 and 547, an obvious circuit for energizing the winding of the boundary and hazard slave relay R555 and for illuminating the boundary and hazard lamps 103 and 104, respectively. The boundary and hazard slave relay R555 then operates to complete, at the contacts 556, an obvious circuit for illuminating the pilot lamp 317 disposed in the group of pilot lamps on the control panel 300, thereby to indicate to the dispatcher that the boundary and hazard lamps 103 and 104, respectively, associated with the flying field are illuminated.

Also, when it is desirable to illuminate the lamps associated with a particular gate, such, for example, as the gate 1, it is only necessary to operate the corresponding key from its off position to its on position. When the key K1 is operated from its off position to its on position, an obvious circuit is completed for energizing the winding of the gate relay R550, thereby to cause the gate relay R550 to operate and complete, at the contacts 551 and 552, an obvious circuit for energizing the winding of the gate slave relay R560 and for illuminating the gate lamps 116.

The gate slave relay R560 then operates to complete, at the contacts 561, an obvious circuit for illuminating the pilot lamp 311 in the group of pilot lamps disposed on the control panel 300, thereby to indicate to the dispatcher that the gate lamps associated with the first gate are illuminated.

The release of the selected first selector link 895 is effected by operating the key 1K1 from its normal position to its release position, whereupon the previously traced alternative circuit for energizing the lower winding of the test relay R850 is interrupted at the contacts 725 thereof. The test relay R850 then restores to interrupt, at the contacts 851, a further point in the previously traced alternative holding circuit for energizing the lower winding thereof, interrupts, at the contacts 856, the previously traced circuit for energizing the winding of the marking relay R890, interrupts, at the contacts 857, the previously traced path for marking with ground potential the fourth contact in the contact bank 808 of the rotary switch S800, interrupts, at the contacts 859, the previously traced circuit for energizing the lower winding of the switch-through relay R870, and interrupts, at the contacts 850, the previously traced circuit for energizing the winding of the stop relay R860 and for illuminating the pilot lamp 212 included in the first group of pilot lamps on the indicator panel 200. The marking relay R890 then restores to interrupt, at the contacts 891, 892, etc., the previously traced paths for marking with ground potential the contacts previously mentioned in the contact bank 808 of the rotary switch S800. The switch-through relay R870 then restores to interrupt, at the contacts 871, 872, 873 and 874, the previously traced connections between the keys 1K2 and 1K3 and the take off relay R900, the land relay R905, etc., individually associated with the selected runway and R12 in the common equipment. Also, the stop relay R860 restores to interrupt, at the contacts 863, a further point in the previously traced circuit for energizing the lower winding of the switching relay R870. After the key 1K1 is momentarily operated to its release position, it may be returned to its normal position without recompleting the previously traced alternative circuit for energizing the lower winding of the test relay R850.

At this time the first selector link 895 is completely released; also, the markings of the contacts 1 to 11, inclusive, and 14 to 18, inclusive, in the contact bank 808 of the rotary switch S800 and the corresponding contacts in the contact banks of the corresponding rotary switches in the second and third selector links have been removed. Accordingly, at this time, each of the runway ends on the flying field is in readiness for selection so far as the first selector link 895 is concerned. After the first selector link 895 has been released, the keys 1K1, 1K2 and 1K3 are returned to their normal positions and the first selector link 895 is in readiness for further use. At this time all of the signals associated with the various runway ends and the contact lamps disposed along the margins of the various runways have been extinguished as far as the first selector link 895 is concerned.

At this point it is noted that prior to the release of the first selector link 895, the operated test relay R850 in the first selector link 895 positively prevents, by the application of ground potential to the twelfth contact in the contact bank 802 of the rotary switch S800, either the second or the third selector links from selecting the twelfth runway end on the flying field. Furthermore, the operated test relay R850 and the operated marking relay R890 positively prevent, by the application of ground potential to the contacts 1 to 11, inclusive, and 14 to 18, inclusive, in the contact bank 808 of the rotary switch S800, either the second or third selector links from seizing the control apparatus in the common equipment individually associated with the runway ends R1 to R11, inclusive, and R14 to R18, inclusive, although the second and third selector links are operative to select the control apparatus in the common equipment individually associated with the runway ends R1 to R11, inclusive, and R14 to R18, inclusive. Accordingly, at this time, while the first selector link 895 is seizing the control apparatus in the common equipment individually associated with the runway end R12, the second and third links are operative to select and seize only the control apparatus in the common equipment individually associated with the runway end R13. This control of the second and third selector links exercised by the first selector link 895 at this time will be readily understood when it is considered that only the runway end R13 is in nonconflicting relationship with the runway end R12 when the runway end R12 is in use. On the other hand, it will be understood that when the runway end R17 is in use, both the runway ends R16 and R18 may be used as neither of these runway ends is in conflicting relationship with the runway end R17. From an examination of the general crisscross pattern of the runway ends R1 to R18, inclusive, on the flying field 100, the exact nature of the required interlocking arrangement between any selector link in use after it has seized a particular runway end on the flying field and the other selector links will be readily understood.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. A control system comprising a plurality of trunks, a plurality of switches each having access to said trunks, means for selecting any one of said switches for use, means for testing the selection marking of any one of said trunks, means for causing said selected switch to select said one trunk in the event it is tested as not marked against selection, means controlled by the selection of said one trunk for marking said one trunk against selection and for marking certain other of said trunks against seizure, means controlled by the selection of said one trunk for testing the seizure marking of said one trunk, means for causing said selected switch to seize said one trunk in the event it is tested as not marked against seizure, each of said trunks including at least one control circuit, and means for selectively governing the control circuit in a seized one of said trunks.

2. A control system comprising a dispatcher station, a plurality of trunks terminating at said station, a plurality of switches each having access to said trunks, means at said station for selecting any one of said switches for use, means at said station for testing the selection marking of any one of said trunks, means for causing said selected switch to select said one trunk in the event it is tested as not marked against selection, means controlled by the selection of said one trunk for marking said one trunk against selection and for marking certain other of said trunks against seizure, means controlled by the selection of said one trunk for testing the seizure marking of said one trunk, means for causing said selected switch to seize said one trunk in the event it is tested as not marked against seizure, each of said trunks including a plurality of control circuits, and means at said station for selectively governing the control circuits in a seized one of said trunks.

3. A control system comprising a dispatcher station, a plurality of trunks terminating at said station, a plurality of numerical switches each having access to said trunks, a plurality of control switches at said station individually associated with said numerical switches, a signal transmitter at said station operative to transmit different numerical signals, each of said control switches being operative to associate the associated one of said numerical switches with said signal transmitter, thereby to select the associated one of said numerical switches for use, means operative in response to any numerical signal to test the selection marking of a corresponding one of said trunks, means for causing said selected switch to select said one trunk in the event it is tested as not marked against selection, means controlled by the selection of said one trunk for marking said one trunk against selection and for marking certain other of said trunks against seizure, means controlled by the selection of said one trunk for testing the seizure marking of said one trunk, means for causing said selected switch to seize said one trunk in the event it is tested as not marked against seizure, each of said trunks including a plurality of control circuits, and means at said station for selectively governing the control circuits in a seized one of said trunks.

4. A control system comprising a plurality of trunks, a plurality of switches each having access to said trunks, a plurality of control devices individually associated with said switches, each of said devices having a normal position and an operated position, means controlled by the operation of one of said devices from its normal position to its operated position for selecting the associated one of said switches for use, means operative to test the selection marking of any one of said trunks, means controlled in the event said one trunk is tested as not marked against selection for preparing said selected switch to select said one trunk and for marking said one trunk against selection by the other of said switches and for marking certain other of said trunks against seizure, means controlled by the operation of said one device from its operated position back to its normal position for causing said selected switch to select said one trunk and to test the seizure marking of said one trunk, means for causing said selected switch to seize said one trunk in the event it is tested as not marked against seizure, each of said trunks including at least one control circuit, and means for selectively governing the control circuit in a seized one of said trunks.

5. A control system comprising a plurality of trunks, a plurality of switches each having access to said trunks, a plurality of control devices individually associated with said switches, each of said devices having a normal position and two operated positions, means controlled by the operation of one of said devices from its normal position to one of its operated positions for selecting the associated one of said switches for use, means operative to test the selection marking of any one of said trunks, means controlled in the event said one trunk is tested as not marked against selection for preparing said selected switch to select said one trunk and for marking said one trunk against selection by the other of said switches and for marking certain other of said trunks against seizure, means controlled by the operation of said one device from its one operated position back to its normal position for causing said selected switch to select said one trunk and to test the seizure marking of said one trunk, means for causing said selected switch to seize said one trunk in the event it is tested as not marked against seizure, each of said trunks including at least one control circuit, means for selectively governing the control circuit in a seized one of said trunks, means controlled by the operation of said one device from its normal position to the other of its operated positions for releasing said selected switch, and means controlled by the release of said selected switch for marking said one trunk to be selected and for marking said other trunks to be seized.

6. A control system comprising a plurality of trunks, a plurality of links each having access to said trunks, control apparatus, means for selecting any one of said links for use and for associating said selected link with said control apparatus, means controlled when said selected link is associated with said control apparatus for preventing any of the other of said links from being associated with said control apparatus, means for selectively operating said control apparatus to test the selection marking of any one of said trunks, means for causing said selected link to select said one trunk in the event it is tested as not marked against selection, means controlled by the selection of said one trunk for causing said selected link to mark said one trunk against selection and to mark certain other of said trunks against seizure and to test the seizure marking of said one trunk, means for causing said selected switch to seize said one trunk in the event it is tested as not marked against seizure, each of said trunks including at least one control circuit, and means for selectively governing the control circuit in a seized one of said trunks.

7. A control system comprising a plurality of trunks, a plurality of links each having access to said trunks, each of said links including a test relay and two marking relays, control apparatus including a test relay, means for selecting any one of said links for use and for associating said selected link with said control apparatus, means controlled when said selected link is associated with said control apparatus for preventing any of the other of said links from being associated with said control apparatus, means for selectively operating said control apparatus to cause the test relay thereof to test the selection marking of any one of said trunks, means controlled by the test relay of said control apparatus in the event said one trunk is tested as not marked against selection for causing said selected link to select said one trunk and for causing one of the marking relays of said selected link to mark said one trunk against selection and for causing the other of the marking relays of said selected link to mark certain other of said trunks against seizure and for causing the test relay of said selected link to test the seizure marking of said one trunk, means controlled by the test relay of said selected link in the event said one trunk is tested as not marked against seizure for causing said selected link to seize said one trunk, each of said trunks including at least one control circuit, and means for selectively governing the control circuit in a seized one of said trunks.

8. A control system comprising a plurality of trunks, a plurality of links each having access to said trunks, control apparatus, means for selecting any one of said links for use and for associating said selected link with said control apparatus, means controlled when said selected link is associated with said control apparatus for preventing any of the other of said links from being associated with said control apparatus, said control apparatus being responsive to any given number of impulses to test the selection marking of a corresponding one of said trunks, means for transmitting any given number of impulses to said control apparatus, means for causing said selected link to select said one trunk in the event it is tested as not marked against selection, means controlled by the selection of said one trunk for causing said selected link to mark said one trunk against selection and to mark certain other of said trunks against seizure and to test the seizure marking of said one trunk, means for causing said selected switch to seize said one trunk in the event it is tested as not marked against seizure, each of said trunks including at least one control circuit, and means for selectively governing the control circuit in a seized one of said trunks.

9. A control system comprising a plurality of trunks, a plurality of links each including a first multi-position switch and a second multi-position switch, the second switch of each of said links having access to said trunks, control apparatus including a multi-position switch, means for selecting any one of said links for use and for associating said selected link with said control apparatus, means controlled when said selected link is associated with said control apparatus for preventing any of the other of said links from being associated with said control apparatus, said control apparatus being responsive to any given number of impulses to operate the switch thereof to a corresponding one of its positions, means for transmitting any given number of impulses to said control apparatus, means included in said control apparatus and controlled when the switch thereof is operated to the one position for testing the selecting marking of the corresponding one of said trunks, means controlled in the event said one trunk is tested as not marked against selection for causing the first switch of said selected link to be operated to one of its positions corresponding to the one position of the switch of said control apparatus and for causing said selected link to mark said one trunk against selection and to mark certain other of said trunks against seizure, means for causing the second switch of said selected link to be operated to one of its positions corresponding to the one position of the first switch thereof, thereby to select said one trunk, means for causing said selected link to test the seizure marking of said one trunk, means for causing said selected link to seize said one trunk in the event it is tested as not marked against seizure, each of said trunks including at least one control circuit, and means for selectively governing the control circuit in a seized one of said trunks.

10. A control system comprising a plurality of trunks, some of said trunks having one digit designations and other of said trunks having two digit designations, an automatic switch having settings individually corresponding to said trunks, a numerical switch, means for transmitting different digits to said numerical switch, said numerical switch including means responsive to the digits 1 or 2 respectively to mark for selection the trunks designated 1 or 2 and responsive to the digit 1 followed by the digits 1 or 2 respectively to mark for selection the trunks designated 11 or 12, and means for causing said automatic switch to operate to the setting corresponding to any one of said trunks marked for selection.

11. A control system comprising a plurality of trunks, some of said trunks having one digit designations and other of said trunks having two digit designations, a plurality of automatic switches each having access to said trunks, a numerical switch, means for selecting any one of said automatic switches for use and for associating said selected automatic switch with said numerical switch, means for transmitting different digits to said numerical switch, said numerical switch including means responsive to the digits 1 or 2 respectively to mark for selection the trunks designated 1 or 2 and responsive to the digit 1 followed by the digits 1 or 2 respectively to mark for selection the trunks designated 11 or 12, and means for causing said selected automatic switch to select any one of said trunks marked for selection.

12. A control system comprising a plurality of trunks, some of said trunks having one digit designations and other of said trunks having two digit designations, an automatic switch having settings individually corresponding to said trunks, a numerical switch, means for transmitting different digits to said numerical switch, means controlled when said numerical switch responds to any first digit other than the digit 1 for preventing said numerical switch from responding to a second digit and controlled when said numerical switch responds to the first digit 1 for rendering said numerical switch responsive to a second digit, said numerical switch including means responsive to the first digits 1 or 2 respectively to mark for selection the trunks designated 1 or 2 and responsive to the first digit 1 and the second digits 1 or 2 respectively to mark for selection the trunks designated 11 or 12, and means for causing said automatic switch to operate to the setting corresponding to any one of said trunks marked for selection.

13. A control system comprising a plurality of trunks, some of said trunks having one digit designations and other of said trunks having two digit designations, a plurality of automatic switches each having access to said trunks, a numerical switch, means for selecting any one of said automatic switches for use and for associating said selected automatic switch with said numerical switch, means for transmitting different digits to said numerical switch, means for testing the selection marking of any one of said trunks, said numerical switch including means responsive to the digits 1 or 2 respectively to cause said testing means to test the selection marking of the trunks designated 1 or 2 and responsive to the digit 1 followed by the digits 1 or 2 respectively to cause said testing means to test the selection marking of the trunks designated 11 or 12, means controlled in the event any one of said trunks is tested as not marked against selection for causing said selected automatic switch to select said one trunk, and means controlled by said selected automatic switch for marking said one trunk against selection.

14. A control system comprising a plurality of trunks, each of said trunks including a test conductor, some of said trunks having one digit designations and other of said trunks having two digit designations, a plurality of automatic switches each having access to said trunks, a numerical switch including two contact banks and two wipers respectively associated therewith, the test conductors of said trunks having one digit designations terminating in one of said contact banks and the test conductors of said trunks having two digit designations terminating in the other of said contact banks, means for selecting any one of said automatic switches for use and for associating said selected automatic switch with said numerical switch, means for testing the selection marking of the test conductor of any one of said trunks, means including a switching relay controlled when said numerical switch responds to the digits 1 or 2 for causing said testing means to test the selection marking of the test conductors terminating in said one contact bank and respectively corresponding to the trunks designated 1 or 2 and controlled when said numerical switch responds to the digit 1 followed by the digits 1 or 2 for causing said testing means to test the selection marking of the test conductors terminating in said other contact bank and respectively corresponding to the trunks designated 11 or 12, means controlled in the event the test conductor of any one of said trunks is tested as not marked against selection for causing said selected automatic switch to select said one trunk, and means controlled by said selected automatic switch for marking the test conductor of said one trunk against selection.

15. In a control system, a plurality of trunks which under certain conditions are to be marked against selection and under different conditions are to be marked against seizure, a plurality of links having access to said trunks, means for controlling said links to select any of said trunks not marked against selection and to seize selected ones of said trunks not marked against seizure, and means controlled in accordance with the operation of said links for selectively marking said trunks against both selection and seizure.

16. A control system comprising a plurality of trunks, a plurality of links having access to said trunks, means for controlling said links to select any of said trunks not marked against selection and to seize any selected ones of said trunks not marked against seizure, and means controlled in accordance with the operation of any one of said links to select a given one of said trunks for marking said one trunk against selection and for marking at least one other of said trunks against seizure.

17. A control system comprising a plurality of trunks, certain of said trunks being arranged for conflicting control purposes, a plurality of links having access to said trunks, means for controlling said links to select any of said trunks not marked against selection and to seize selected ones of said trunks not marked against seizure, and means controlled in accordance with the operation of any one of said links to select a given one of said trunks for marking said one trunk against selection and for marking against seizure all of the trunks arranged for control purposes which conflict with the control purpose of said one trunk.

IMRE MOLNAR.